(12) United States Patent
Kanagovi et al.

(10) Patent No.: US 12,086,172 B2
(45) Date of Patent: *Sep. 10, 2024

(54) DETERMINING NAMED ENTITIES ASSOCIATED WITH ASPECT TERMS EXTRACTED FROM DOCUMENTS HAVING UNSTRUCTURED TEXT DATA

(71) Applicant: Dell Products L.P., Round Rock, TX (US)

(72) Inventors: Ramakanth Kanagovi, Bengaluru (IN); Shrikrishna K. Joisa, Bengaluru (IN); Sandeep Ratnakar, Bengaluru (IN); Arun Swamy, Bengaluru (IN); Sumant Sahoo, Bengaluru (IN); Prakash Sridharan, Bengaluru (IN); Ravi Shukla, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 483 days.

This patent is subject to a terminal disclaimer.

(21) Appl. No.: 17/500,044

(22) Filed: Oct. 13, 2021

(65) Prior Publication Data

US 2023/0116515 A1    Apr. 13, 2023

(51) Int. Cl.
*G06F 16/00* (2019.01)
*G06F 16/34* (2019.01)
(Continued)

(52) U.S. Cl.
CPC .......... *G06F 16/345* (2019.01); *G06F 16/353* (2019.01); *G06F 40/284* (2020.01); *G06F 40/295* (2020.01); *G06N 3/045* (2023.01)

(58) Field of Classification Search
CPC ...... G06F 40/30; G06F 40/284; G06F 40/279; G06F 40/205; G06F 40/295;
(Continued)

(56) References Cited

U.S. PATENT DOCUMENTS 10,325,212 B1 * 6/2019 Paliwal .................... G06N 5/04
11,227,121 B2 * 1/2022 Jezewski ................. G06F 40/30
(Continued)

OTHER PUBLICATIONS

J. H. Lau et al., "An Empirical Evaluation of doc2vec with Practical Insights into Document Embedding Generation," arXiv:1607.05368v1, Jul. 19, 2016, 9 pages.
(Continued)

*Primary Examiner* — Olujimi A Adesanya
(74) *Attorney, Agent, or Firm* — Ryan, Mason & Lewis, LLP

(57) ABSTRACT

An apparatus comprises at least one processing device configured to receive a query to determine associations between named entities and aspect terms for a document, to generate, utilizing a first machine learning model, a first set of encodings classifying words of the document as being aspect or non-aspect terms, to generate, utilizing a second machine learning model, a second set of encodings classifying associations of the words, and to determine, for a given aspect term, attention weights for a given subset of the words surrounding the given aspect term. The processing device is also configured to generate, utilizing a third machine learning model, predictions of association between the given aspect term and named entities recognized in the given subset of the words, and to provide a response to the query comprising at least one of the predicted associations.

20 Claims, 24 Drawing Sheets

(51) Int. Cl.
  *G06F 16/35*   (2019.01)
  *G06F 40/284*  (2020.01)
  *G06F 40/295*  (2020.01)
  *G06N 3/045*   (2023.01)

(58) Field of Classification Search
  CPC .. G06F 16/248; G06F 16/3329; G06F 16/345; G06F 40/20; G06F 16/243; G06F 16/9538; G06F 16/3344; G06F 16/2465; G06F 16/2455; G06F 16/90335; G06F 16/33; G06F 16/438; G06F 40/00
  See application file for complete search history.

(56) References Cited

U.S. PATENT DOCUMENTS

| | | | | |
|---|---|---|---|---|
| 11,334,798 | B2* | 5/2022 | Bhattacharya | G06N 3/04 |
| 11,675,823 | B2* | 6/2023 | Kanagovi | G06F 16/3346 |
| | | | | 707/739 |
| 2010/0306248 | A1* | 12/2010 | Bao | G06F 16/34 |
| | | | | 707/769 |
| 2016/0140210 | A1* | 5/2016 | Pendyala | G06F 40/205 |
| | | | | 707/737 |
| 2019/0370385 | A1* | 12/2019 | Asthana | G06F 16/285 |
| 2021/0089860 | A1* | 3/2021 | Heere | G06N 20/00 |
| 2023/0022673 | A1* | 1/2023 | Derzsy | G06N 5/022 |
| 2023/0067976 | A1* | 3/2023 | Bhusan | G06F 40/284 |

OTHER PUBLICATIONS

M. Bilgin et al., "Sentiment Analysis on Twitter data with Semi-Supervised Doc2Vec," International Conference on Computer Science and Engineering, Oct. 5-8, 2017, pp. 661-666.

J. Pilault et al., "On Extractive and Abstractive Neural Document Summarization with Transformer Language Models," Proceedings of the 2020 Conference on Empirical Methods in Natural Language Processing, Nov. 16-20, 2020, pp. 9308-9319.

Y. Liu et al., "Hierarchical Transformers for Multi-Document Summarization," arXiv:1905.13164v1, May 30, 2019, 12 pages.

A. Vaswani et al., "Attention Is All You Need," 31st Conference on Neural Information Processing Systems, Dec. 4-9, 2017, 11 pages.

A. Akbik et al., "Pooled Contextualized Embeddings for Named Entity Recognition," Annual Conference of the North American Chapter of the Association for Computational Linguistics, Jun. 2-7, 2019, pp. 724-728.

B. N. D. Santos et al., "Multi-Domain Aspect Extraction Using Bidirectional Encoder Representations from Transformers," IEEE Access, vol. 9, Jun. 14, 2021, pp. 91604-91613.

Wikipedia, "SemEval," https://en.wikipedia.org/wiki/SemEval, Apr. 30, 2021, 9 pages.

Schmitt et al., "A Replicable Comparison Study of NER Software: StanfordNLP, NLTK, OpenNLP, SpaCy, Gate," Sixth International Conference on Social Networks Analysis, Management and Security, Oct. 22-25, 2019, pp. 338-343.

* cited by examiner

500

| ROUND 1 | VALUES |
|---|---|
| 66TH PERCENTILE | 0.573178 |
| 33RD PERCENTILE | 0.489662 |

505

| ID | SENTENCE | COSINE SIMILARITY | BUCKET |
|---|---|---|---|
| 0 | THE GLOBAL VIRTUALIZATION AND CLOUD MANAGEMENT SOFTWARE MARKET RESEARCH REPORT PRIMARILY... | 0.792039275 | HIGH |
| 1 | THE REPORT ALSO UNDERSCORES POTENTIAL RISKS, THREATS, OBSTACLES, AND UNCERTAINTIES IN THE MARKET... | 0.519616187 | MEDIUM |
| 2 | THE REPORT COVERS AN EXTENSIVE SPAN OF THE GLOBAL VIRTUALIZATION AND CLOUD MANAGEMENT SOFTWARE... | 0.703919172 | HIGH |
| 3 | THE REPORT PRESENTS THE MARKET COMPETITIVE LANDSCAPE AND A CORRESPONDING DETAILED ANALYSIS... | 0.521891117 | MEDIUM |
| 4 | TOP COMPANIES IN THE GLOBAL VIRTUALIZATION AND CLOUD MANAGEMENT SOFTWARE MARKET: VENDOR1... | 0.865344048 | HIGH |
| 5 | EACH OF THESE REGIONS IS ANALYZED ON BASIS OF MARKET FINDINGS ACROSS MAJOR COUNTRIES IN THESE... | 0.466653317 | LOW |
| 6 | NOTE: ALL THE REPORTS THAT WE LIST HAVE BEEN TRACKING THE IMPACT OF COVID-19... | 0.490353465 | MEDIUM |
| 7 | BOTH UPSTREAM AND DOWNSTREAM THE ENTIRE SUPPLY CHAIN HAS BEEN ACCOUNTED FOR WHILE DOING... | 0.488485664 | LOW |
| 8 | ALSO, WHERE POSSIBLE, WE WILL PROVIDE AN ADDITIONAL COVID-19 UPDATE SETTLEMENT/REPORT TO THE... | 0.52724129 | MEDIUM |
| 9 | ... | 0.006554112 | LOW |

FIG. 5A

ROUND 1 – FINAL SUMMARY

THE GLOBAL VIRTUALIZATION AND CLOUD MANAGEMENT SOFTWARE MARKET RESEARCH REPORT PRIMARILY AIMS TO HINT AT OPPORTUNITIES AND CHALLENGES IN THE GLOBAL INDUSTRY. THE REPORT COVERS AN EXTENSIVE SPAN OF THE GLOBAL VIRTUALIZATION AND CLOUD MANAGEMENT SOFTWARE MARKET RANGING FROM HISTORICAL AND CURRENT EVENTS TO FUTURISTIC STITCH OF THE MARKET TOP COMPANIES IN THE GLOBAL VIRTUALIZATION AND CLOUD MANAGEMENT SOFTWARE MARKET: VENDOR1, VENDOR 2, VENDOR 3. FOR COMPREHENSIVE UNDERSTANDING OF MARKET DYNAMICS, THE GLOBAL VIRTUALIZATION AND CLOUD MANAGEMENT SOFTWARE MARKET IS ANALYZED ACROSS KEY GEOGRAPHIES NAMELY: UNITED STATES, CHINA, EUROPE, JAPAN, SOUTHEAST ASIA, INDIA AND OTHERS

| ROUND 2 | VALUES |
|---|---|
| 66TH PERCENTILE | 0.590834322 |
| 33RD PERCENTILE | 0.465102539 |

600

| ID | SENTENCE | COSINE SIMILARITY | BUCKET |
|---|---|---|---|
| 0 | THE REPORT ALSO UNDERSCORES POTENTIAL RISKS, THREATS, OBSTACLES, AND UNCERTAINTIES IN THE MARKET... | 0.586119711 | MEDIUM |
| 1 | THE REPORT PRESENTS THE MARKET COMPETITIVE LANDSCAPE AND A CORRESPONDING DETAILED ANALYSIS... | 0.68268311 | HIGH |
| 2 | EACH OF THESE REGIONS IS ANALYZED ON BASIS OF MARKET FINDINGS ACROSS MAJOR COUNTRIES IN THESE... | 0.602957606 | HIGH |
| 3 | NOTE: ALL THE REPORTS THAT WE LIST HAVE BEEN TRACKING THE IMPACT OF COVID-19... | 0.478002816 | MEDIUM |
| 4 | BOTH UPSTREAM AND DOWNSTREAM THE ENTIRE SUPPLY CHAIN HAS BEEN ACCOUNTED FOR WHILE DOING... | 0.442168713 | LOW |
| 5 | ALSO, WHERE POSSIBLE, WE WILL PROVIDE AN ADDITIONAL COVID-19 UPDATE SETTLEMENT/REPORT TO THE... | 0.484700412 | MEDIUM |
| 6 | ... | 0.085309811 | LOW |

ROUND 2 – FINAL SUMMARY

THE GLOBAL VIRTUALIZATION AND CLOUD MANAGEMENT SOFTWARE MARKET RESEARCH REPORT PRIMARILY AIMS TO HINT AT OPPORTUNITIES AND CHALLENGES IN THE GLOBAL INDUSTRY. THE REPORT COVERS AN EXTENSIVE SPAN OF THE GLOBAL VIRTUALIZATION AND CLOUD MANAGEMENT SOFTWARE MARKET RANGING FROM HISTORICAL AND CURRENT EVENTS TO FUTURISTIC STICH OF THE MARKET TOP COMPANIES IN THE GLOBAL VIRTUALIZATION AND CLOUD MANAGEMENT SOFTWARE MARKET: VENDOR1, VENDOR2, VENDOR3. FOR COMPREHENSIVE UNDERSTANDING OF MARKET DYNAMICS, THE GLOBAL VIRTUALIZATION AND CLOUD MANAGEMENT SOFTWARE MARKET IS ANALYZED ACROSS KEY GEOGRAPHIES NAMELY: UNITED STATES, CHINA, EUROPE, JAPAN, SOUTHEAST ASIA, INDIA AND OTHERS. THE REPORT PRESENTS THE MARKET COMPETITIVE LANDSCAPE AND A CORRESPONDING DETAILED ANALYSIS OF THE MAJOR VENDOR/KEY PLAYERS IN THE MARKET EACH OF THESE REGIONS IS ANALYZED ON BASIS OF MARKET FINDINGS ACROSS MAJOR COUNTRIES IN THESE REGIONS FOR A MACRO-LEVEL UNDERSTANDING OF THE MARKET.

BLOCKCHAIN AND RELATED DISTRIBUTED AUTHENTICATION AND ACCOUNTING TECHNOLOGIES ARE POISED TO TRANSFORM ICT, AND IS SO DOING, CAUSING SUBSTANTIAL DISINTERMEDIATION ACROSS A WIDE VARIETY OF INDUSTRY VERTICALS. LESSONS LEARNED IN FINTECH AND TRADITIONAL BANKING FROM THE DEPLOYMENT AND OPERATION OF DECENTRALIZED AUTHENTICATION, CLEARING AND SETTLEMENT WILL BE APPLIED TOWARDS MANY TELECOM AND COMPUTING PROBLEMS FOR THE BENEFIT OF MANY INDUSTRY VERTICALS. THE IMPACT WILL BE WIDE-RANGING, INCLUDING EVERYTHING FROM INVESTING/TRADING TO DEEP CHANGES TO SUPPLY CHAINS AND RELATIONSHIPS BETWEEN VENDORS, CUSTOMERS, AND PEERS...

FIG. 11

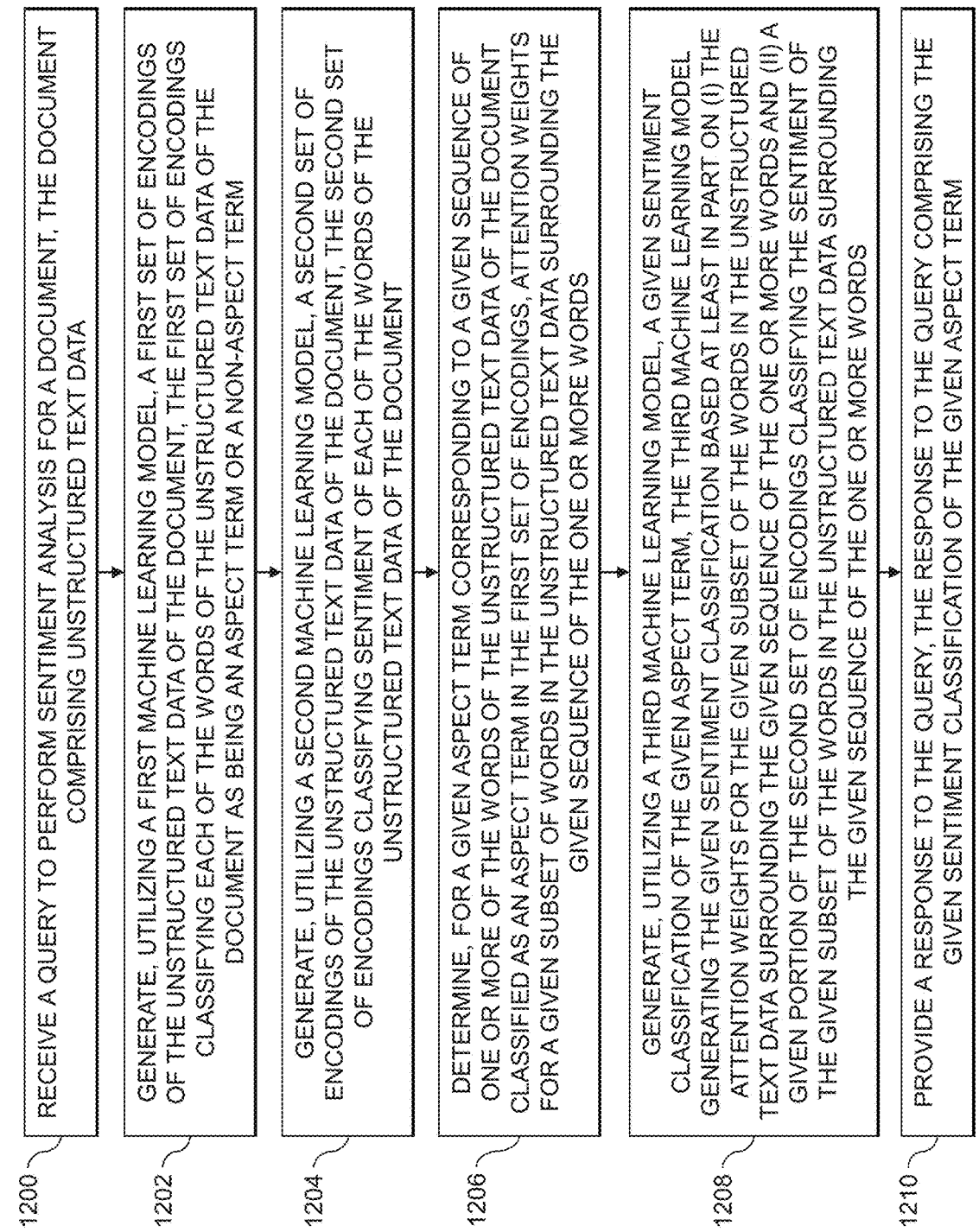

1500

VENDOR1 NOW RECOGNIZES THAT ADVANCES IN METAL AM TECHNOLOGY HAVE MADE IT POSSIBLE TO FORM EXTREMELY COMPLEX SHAPES WHILE MEETING APPROPRIATE QUALITY STANDARDS. MAJOR MANUFACTURING COMPANIES ARE ACCELERATING THEIR INVESTMENT IN AM TECHNOLOGY AS ONE OF THE CORE AREAS OF THE DIGITALIZATION OF MANUFACTURING PROCESSES, ONE SUCH EXAMPLE IS VENDOR2. VENDOR1 AIMS TO FURTHER EXPAND ITS AM BUSINESS BY SELLING AM EQUIPMENT (EOS METAL AND PLASTIC AM SYSTEMS, AS WELL AS DLYTE POST-PROCESSING SYSTEMS), MAINTENANCE AND CONTRACT MANUFACTURING (VIA THE AMBITION PROGRAM), AS WELL AS DEVELOPING ENGINEERS THROUGH LARGE-SCALE INVESTMENT AND SOFTWARE DEVELOPMENT.

FIG. 15

DETERMINING NAMED ENTITIES ASSOCIATED WITH ASPECT TERMS EXTRACTED FROM DOCUMENTS HAVING UNSTRUCTURED TEXT DATA

FIELD

The field relates generally to information processing, and more particularly to techniques for managing data.

BACKGROUND

In many information processing systems, data stored electronically is in an unstructured format, with documents comprising a large portion of unstructured data. Collection and analysis, however, may be limited to highly structured data, as unstructured text data requires special treatment. For example, unstructured text data may require manual screening in which a corpus of unstructured text data is reviewed and sampled by service personnel. Alternatively, the unstructured text data may require manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present invention provide techniques for determining named entities associated with aspect terms extracted from documents having unstructured text data.

In one embodiment, an apparatus comprises at least one processing device comprising a processor coupled to a memory. The at least one processing device is configured to perform the steps of receiving a query to determine associations between named entities and aspect terms for a document, the document comprising unstructured text data, generating, utilizing a first machine learning model, a first set of encodings of the unstructured text data of the document, the first set of encodings classifying each word of the unstructured text data of the document as being an aspect term or a non-aspect term, generating, utilizing a second machine learning model, a second set of encodings of the unstructured text data of the document, the second set of encodings classifying associations of each word of the unstructured text data of the document, and determining, for a given aspect term corresponding to a given sequence of one or more of the words of the unstructured text data of the document classified as an aspect term in the first set of encodings, attention weights for a given subset of words in the unstructured text data surrounding the given sequence of the one or more words. The at least one processing device is also configured to perform the steps of generating, utilizing a third machine learning model, predictions of association between the given aspect term and one or more named entities recognized in the given subset of the words in the unstructured text data surrounding the given sequence of the one or more words, the third machine learning model generating the predictions based at least in part on (i) the attention weights for the given subset of the words in the unstructured text data surrounding the given sequence of the one or more words and (ii) a given portion of the second set of encodings classifying the associations of the given subset of the words in the unstructured text data surrounding the given sequence of the one or more words, and providing a response to the query, the response to the query comprising at least one of the predicted associations between the given aspect term and the one or more named entities.

These and other illustrative embodiments include, without limitation, methods, apparatus, networks, systems and processor-readable storage media.

BRIEF DESCRIPTION OF THE DRAWINGS

FIGS. 5A and 5B show a first round or iteration of generating a document summary using the FIG. 4 process flow in an illustrative embodiment.

FIGS. 6A and 6B show a second round or iteration of generating a document summary using the FIG. 4 process flow in an illustrative embodiment.

FIG. 11 shows aspect terms extracted from a portion of a document in an illustrative embodiment.

FIG. 12 is a flow diagram of an exemplary process for sentiment analysis for aspect terms extracted from documents having unstructured text data in an illustrative embodiment.

FIG. 15 shows an example of aspect terms and named entities identified in a portion of a document in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
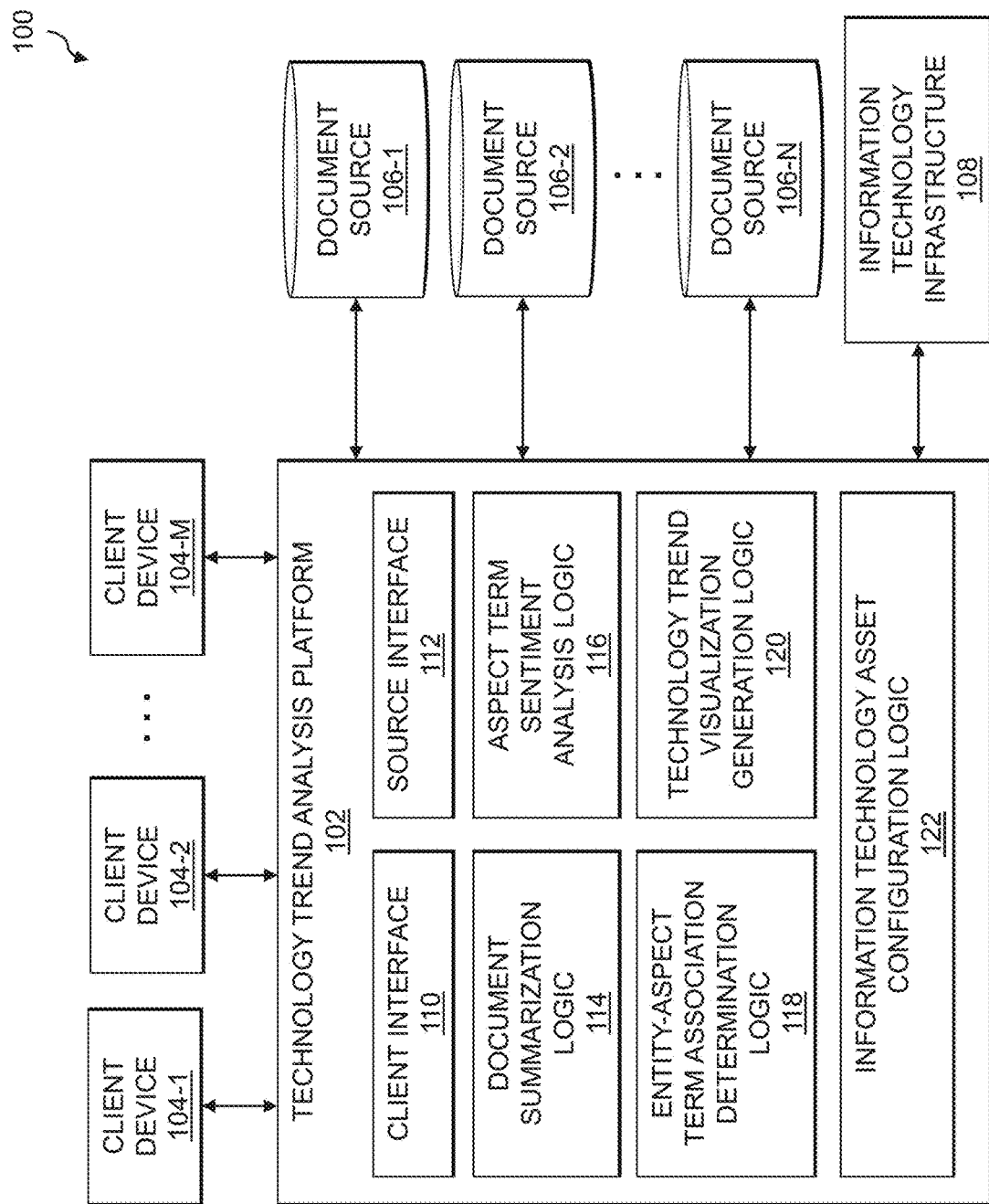
FIG. 1 is a block diagram of an information processing system configured for technology trend analysis in an illustrative embodiment of the invention.

FIG. 1 shows an information processing system 100 configured in accordance with an illustrative embodiment. The information processing system 100 is assumed to be built on at least one processing platform and is configured to provide functionality for performing technology trend analysis. The information processing system 100 includes a technology trend analysis platform 102 that is used or accessed by a plurality of client devices 104-1, 104-2, . . . 104-M (collectively, client devices 104). The technology trend analysis platform 102 is configured to perform various types of technology trend analysis through analyzing documents obtained from a set of document sources 106-1, 106-2, . . . 106-N (collectively, document sources 106). The information processing system 100 also includes an information technology (IT) infrastructure 108.

The technology trend analysis platform 102, client devices 104, document sources 106 and IT infrastructure 108 are assumed to be coupled via one or more networks (not explicitly shown in FIG. 1). Such networks are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtual computing resources, such as virtual machines (VMs), software containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

Although shown as external to the IT infrastructure 108 in FIG. 1, one or more of the technology trend analysis platform 102, client devices 104 and document sources 106 may comprise physical and/or virtual computing resources of the IT infrastructure 108. Physical and virtual computing resources are examples of what is more generally referred to herein as "assets" of the IT infrastructure 108. Physical computing resources may include physical hardware such as servers, storage systems, networking equipment, IoT devices, other types of processing and computing devices, etc. Virtual computing resources may include VMs, software containers, etc. One or more of the document sources 106 may be implemented using one or more storage systems or devices. In some embodiments, one or more of the storage systems utilized to implement the document sources 106 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the technology trend analysis platform 102, the client devices 104, the document sources 106 and the IT infrastructure 108, as well as to support communication between the technology trend analysis platform 102, the client devices 104, the document sources 106, the IT infrastructure 108 and other related systems and devices not explicitly shown.

In some embodiments, the technology trend analysis platform 102 is operated by or otherwise associated with one or more companies, businesses, organizations, enterprises, or other entities. For example, in some embodiments the technology trend analysis platform 102 may be operated by a single entity, such as in the case of a particular company that wishes to perform internal technology trend analysis to guide IT investment (e.g., in the IT infrastructure 108), research and development, and other tasks. In other embodiments, the technology trend analysis platform 102 may provide a service that can be used by or associated with multiple different entities. The technology trend analysis platform 102, for example, may be a service that is offered by a cloud computing platform or other data center shared amongst multiple different entities.

The term "user" herein is intended to be broadly construed so as to encompass numerous arrangements of human, hardware, software or firmware entities, as well as combinations of such entities.

The technology trend analysis platform 102 comprises a client interface 110, a source interface 112, document summarization logic 114, aspect term sentiment analysis logic 116, entity-aspect term association determination logic 118, technology trend visualization generation logic 120, and IT asset configuration logic 122. As will be described in further detail below, the source interface 112 is configured to obtain documents from the document sources 106, with such documents being parsed or otherwise analyzed by the technology trend visualization generation logic 120 to generate visualizations presented to the client devices 104 via the client interface 110. Such visualizations may include, but are not limited to: document summaries produced by the document summarization logic 114, and visualizations of aspect terms (also referred to as themes) and their sentiments across technology topics, industries and vendors produced by the aspect term sentiment analysis logic 116, and entity-aspect term association determination logic 118. The visualizations may comprise interactive visualizations, allowing the client devices 104 to interact with the visualizations to explore various technology trends. This may trigger use of the IT asset configuration logic 122 to adjust or modify configuration of assets in the IT infrastructure 108 based on the technology trends that are discovered and analyzed.

Figure 2:
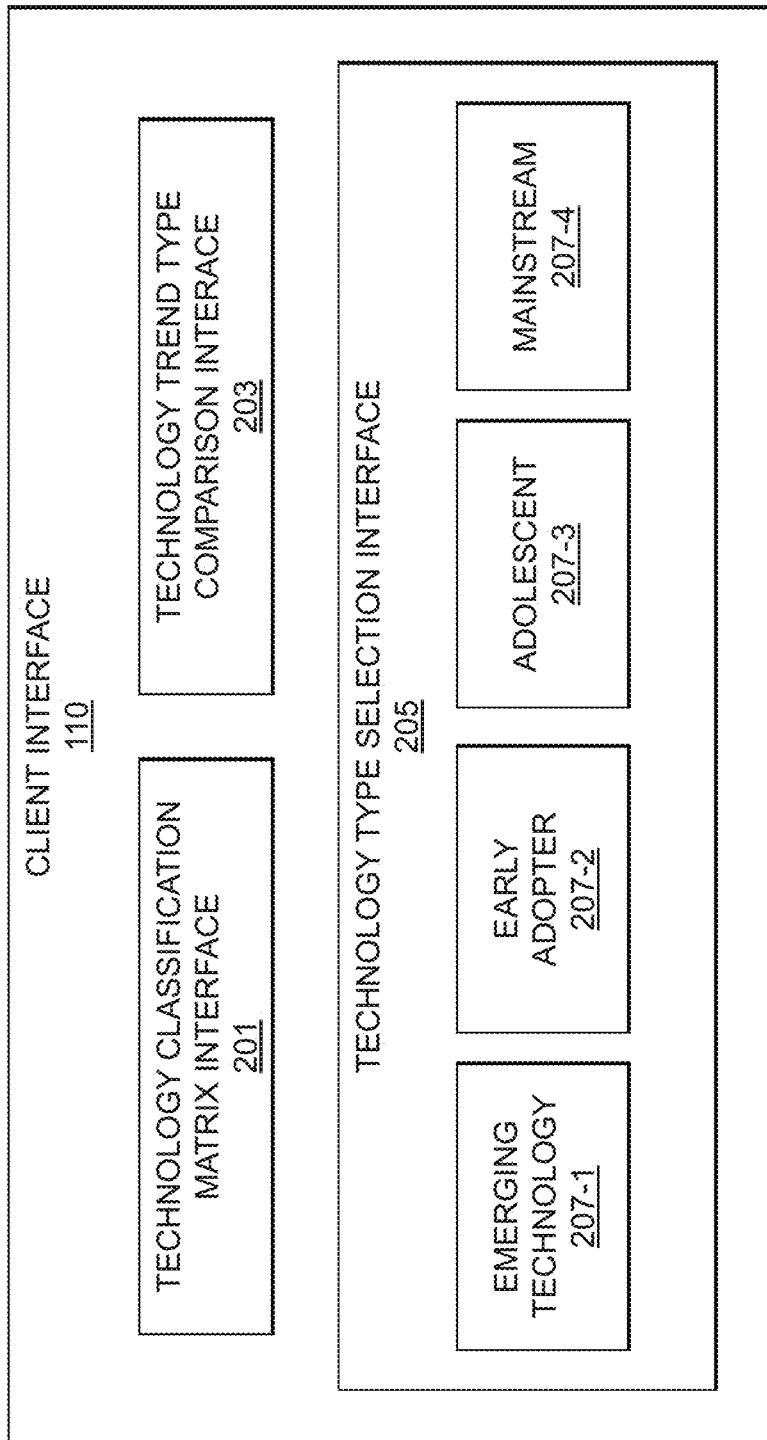
FIG. 2 is a block diagram of a client interface of the trend analysis platform of FIG. 1 in an illustrative embodiment.

FIG. 2 shows a detailed view of the client interface 110, which provides various interface features enabling the client devices 104 (or users thereof) to select types of visualizations to produce and/or display. Such interface features include, for example, a technology classification matrix interface 201, a technology trend type comparison interface 203, and a technology type selection interface 205. The technology type selection interface 205 enables a user to select different types of technology trends to analyze or display in a technology classification matrix using interface 201 or for performing a relative comparison of diverse technology trend types using the technology trend type comparison interface 203. Examples of different technology types include emerging technology 207-1 (e.g., technology mainly seen in academia and a small number of specialized markets), early adopter 207-2 (e.g., technology for which customers are starting to look for solutions), adolescent 207-3 (e.g., technology being discussed more widely by analysts and thought leaders), and mainstream 207-4 (e.g., technology there is a clear need for and for which many customers are implementing solutions). It should be appreciated that the particular number and types of technologies 207 are shown by way of example only, and that other types of technology types may be selected and visualized in other embodiments.

Consider, as an example, technology topics such as artificial intelligence (AI), containers, open source hardware and web-scale computing. Using the technology classification matrix interface 201, charts, plots or other types of visualizations may be produced using the technology trend visualization generation logic 120 comparing how prevalent such technology topics are across different industries (e.g., telecom, retail, energy, government, healthcare, banking and insurance, manufacturing, transportation, education, web tech, etc.) and across different vendors. Using the technology trend type comparison interface 203, various other types of charts, plots or other types of visualizations may be produced using the technology trend visualization generation logic 120 comparing aspect terms and their associated sentiments across technology topics, technology vendors, etc. Such visualizations, which may be produced using the aspect term sentiment analysis logic 116 and/or the entity-aspect term association logic 118, may be interactive where selection of particular aspect terms, technology topics and/or technology vendors can be selected to enable an end-user to view different documents related to such selected aspect terms, technology topics and/or technology vendors, as well as document summaries for such displayed documents as produced using the document summarization logic 114. Interface features of the generated visualizations may also be used to control the configuration of assets of the IT infrastructure 108 using the IT asset configuration logic 122.

Figure 3:
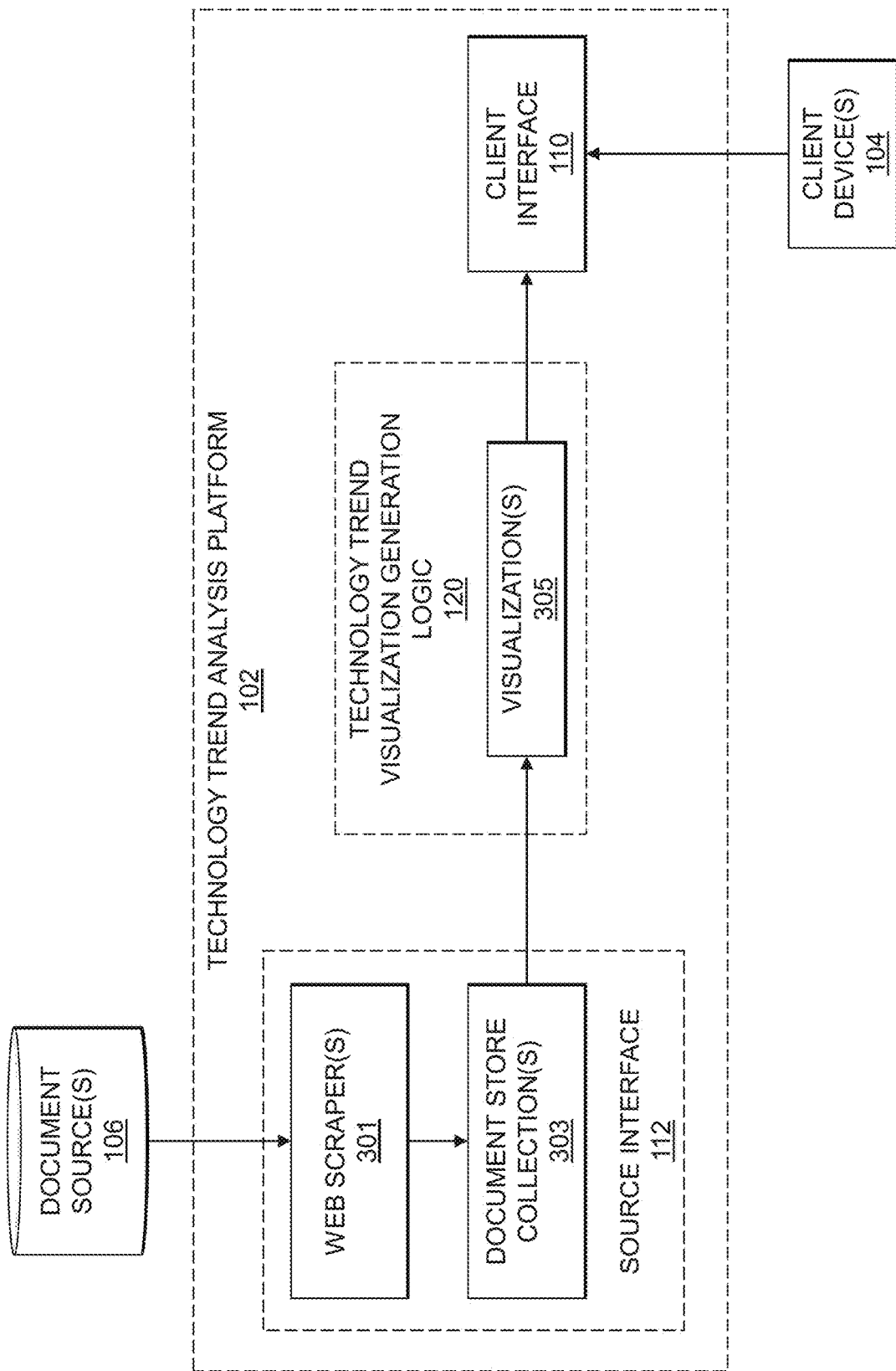
FIG. 3 is a system flow illustrating generation of visualizations utilizing the trend analysis platform of FIG. 1 in an illustrative embodiment.

FIG. 3 shows a system flow for generation of visualizations utilizing the technology trend analysis platform 102. The source interface 112 includes one or more web scrapers 301 which can parse documents from web-accessible document sources 106. The web scrapers 301 store documents in one or more document store collections 303. The technology trend visualization generation logic 120 analyzes documents from the document store collections 303 to produce visualizations 305 (e.g., utilizing the logic 114, 116 and 118).

Client devices 104 access the technology trend analysis platform 102 via the client interface 110, and select visualizations 305 to generate and/or view. The visualizations 305 may be for cluster-based aspect term analysis, aspect term extraction, aspect term summarization, sentiment analysis (e.g., by industry, by technology type, by vendor), etc.

In the present embodiment, alerts or notifications generated by the technology trend analysis platform 102 are provided over a network to the client devices 104 (e.g., via the client interface 110), or to a system administrator, IT manager or other authorized personnel via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over a network with the technology trend analysis platform 102. For example, a given host agent may comprise a mobile telephone equipped with a mobile application configured to receive alerts or notifications from the technology trend analysis platform 102 and to provide an interface for the host agent to select actions to take in response to the alert or notification. The alerts or notifications, for example, may comprise indications regarding availability of generated visualizations, updates to previously-generated visualizations, etc. The alerts or notifications may also or alternatively include recommendations for guiding further action (e.g., IT investment by an entity, investment or allocation of resources for research and development, product engineering, determining whether to pursue or avoid different technologies, etc.), and for initiating various actions to configure assets of the IT infrastructure 108 (e.g., using the IT asset configuration logic 122).

It should be noted that a "host agent" as this term is generally used herein may comprise an automated entity, such as a software entity running on a processing device. Accordingly, a host agent need not be a human entity.

The technology trend analysis platform 102 in the FIG. 1 embodiment is assumed to be implemented using at least one processing device. Each such processing device generally comprises at least one processor and an associated memory, and implements one or more functional modules or logic for controlling certain features of the technology trend analysis platform 102, such as the document summarization logic 114, the aspect term sentiment analysis logic 116, the entity-aspect term association determination logic 118, the technology trend visualization generation logic 120 and IT asset configuration logic 122. At least portions of such logic may be implemented at least in part in the form of software that is stored in memory and executed by a processor.

It is to be appreciated that the particular arrangement of the technology trend analysis platform 102, the client devices 104 and the document sources 106 illustrated in the FIG. 1 embodiment is presented by way of example only, and alternative arrangements can be used in other embodiments. For example, the technology trend analysis platform 102 and one or more of the document sources 106 may be part of the same IT infrastructure (e.g., IT infrastructure 108), such as a same data center or cloud computing platform. Further, the technology trend analysis platform 102 may be implemented at least partially internal to one or more of the client devices 104. As another example, the functionality associated with the document summarization logic 114, the aspect term sentiment analysis logic 116, the entity-aspect term association determination logic 118, the technology trend visualization generation logic 120 and the IT asset configuration logic 122 may be combined into one logical module, or separated across multiple logical modules with the multiple modules possibly being implemented with multiple distinct processors or processing devices.

It is to be understood that the particular set of elements shown in FIG. 1 for performing technology trend analysis is presented by way of illustrative example only, and in other embodiments additional or alternative elements may be used. Thus, another embodiment may include additional or alternative systems, devices and other network entities, as well as different arrangements of modules and other components.

The technology trend analysis platform 102, and other portions of the system 100 may in some embodiments be part of cloud infrastructure as will be described in further detail below. The cloud infrastructure hosting the technology trend analysis platform 102 may also host any combination of the client devices 104, the document sources 106 and the IT infrastructure 108.

The technology trend analysis platform 102 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The technology trend analysis platform 102, the client devices 104, the document sources 106 and the IT infrastructure 108 or components thereof may be implemented on respective distinct processing platforms, although numerous other arrangements are possible. For example, in some embodiments at least portions of the technology trend analysis platform 102, the client devices 104, the document sources 106 and the IT infrastructure 108 may be implemented on the same processing platform. A given client device (e.g., 104-1) can therefore be implemented at least in part within at least one processing platform that implements at least a portion of the technology trend analysis platform 102, the document sources 106 and/or the IT infrastructure 108.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the technology trend analysis platform 102, the client devices 104, the document sources 106 and the IT infrastructure 108, or portions or components thereof, to reside in different data centers. Numerous other distributed implementations are possible. The technology trend analysis platform 102 can also be implemented in a distributed manner across multiple data centers.

Further, there may be multiple instances of the technology trend analysis platform 102, although FIG. 1 shows an embodiment with just one instance. For example, there may be separate instances of the technology trend analysis platform 102 for different subsets of the client devices 104.

Additional examples of processing platforms utilized to implement the technology trend analysis platform 102 in illustrative embodiments will be described in more detail below in conjunction with FIGS. 17 and 18.

For various entities (e.g., a company, business, organization or other type of entity), including entities that offer products and services to customers or end-users, market insights on emerging technology trends is important for product and service engineering, sales enablement, and other tasks. Some of the document sources 106 from which this information can be gathered are news articles, influencer articles, etc. Data consolidation from the latest news sources is critical and transformational to build a point-of-view (POV) on competitive market trends. Influencer sites can similarly provide valuable insights to augment assumptions that are made (e.g., based on analysis of news articles). Some of the ways in which an entity can extract trend information from these and other sources is to: manually read articles and summarize them, which is not scalable; and using third-party or in-house tools to crawl and extract information in an automated fashion, which still requires some manual intervention for creating insights in a consumable format.

In practical, real-world applications the task of analyzing textual news articles and other documents from document sources 106 (e.g., across the world wide web) is complex. It is difficult to extract meaningful information and to present such meaningful information in an easily consumable way for an entity to take actions and plan strategies. In illustrative embodiments, the technology trend analysis platform 102 provides functionality for bringing conversations, topics, themes, aspects and the sentiments that are resonating around a particular domain of interest to help establish best practices and identify competitive whitespace. The technology trend analysis platform 102 may be used, for example, to answer questions such as: what emerging technology should an entity invest in, where does a particular entity stand in the innovation curve as compared with competitors, how to assess sentiments associated with innovations in different technology trends, what use cases does an entity have for different technology trends and where will the next investments come from, which entities are progressing and innovating on which technology topics, what actions and strategies a particular entity needs to devise to beat its competitors, where a particular entity should invest to stay ahead in the technology race, etc. Conventional tools for tracking market shifts and trajectories suffer from various disadvantages, including that they fail to provide a complete overview and often have pockets of information that come at a high cost.

The technology trend analysis platform 102 can advantageously be utilized by an entity to identify and amplify a point of view of technology trends and secular shifts to spur growth. This provides various benefits, including but not limited to: through implementation of the technology trend analysis platform "in-house" for a particular entity, delivery of significant cost savings and customization options for that entity across diverse domains; use of a best of the breed architecture that keeps the technology trend analysis platform 102 up-to-date and available on demand; providing advanced offerings in understanding technology innovation trajectories; enabling multiple user personas ranging from business leaders to analysts to help move into action mode; offering increased insights at significantly lower costs; utilizing state-of-the-art AI to help track patterns from unstructured intelligence across multiple sources; etc.

Conventional approaches for document summarization may involve manual techniques or the use of pre-trained summarization models (e.g., transformers-based models). Manual summarization, however, is not scalable. Transformers-based models are time-consuming (e.g., they may take five minutes per document). In contrast, the techniques described herein for document summarization implemented via the document summarization logic 114 are much faster (e.g., they may take less than 20 seconds per document). Pre-trained summarization models also have character limits (e.g., a document may not exceed 512 characters), while the techniques described herein for document summarization have no such character or other length of document limits.

The document summarization logic 114 provides functionality for summarizing news articles or other types of documents obtained from the document sources 106. The document summarization logic 114 produces such summarizations based on a graded similarity measure between a title and content of a document, followed by iterative filtering of the content. The source interface 112 may be used to crawl the document sources 106 by searching for technology keywords (e.g., 5G, deep learning, etc.) and to create a list of titles and documents collected. Next, a model is used to convert the title and content of documents to vectors. The model may comprise, for example, a doc2vec model (e.g., a natural language processing (NLP) tool for representing documents as a vector) which is trained on some text corpus (e.g., such as the entire English Wikipedia).

Once documents are converted to vectors, the document summarization logic 114 calculates the similarity between each line, sentence or other portion of the document content to the title of the document. Based on different similarity thresholds, the lines, sentences or other portions of the document content are separated into different "buckets." For example, with $33^{rd}$ and $66^{th}$ percentile similarity threshold values, a document's lines can be broken down into "high," "medium" and "low" buckets. Iterative filtering is then applied as follows: lines, sentences or other portions of the document content in the high bucket are added to a final summary (denoted "final_summary") and where the "final_summary" is then made the new title of the document (denoted "new_title") for a subsequent iteration. Portions of the document content in the remaining buckets (e.g., the medium and low buckets) are then compared with new_title to get a fresh set of buckets (e.g., a fresh set of "high" bucket portions of the document content) which are added to final_summary. This process will continue until the amount of content (e.g., lines, sentences or other portions of the document content) exceeds some threshold (e.g., the number of lines or sentences in the final_summary is less than half the lines or sentences in the original document).

The document summarization techniques implemented via the document summarization logic 114 may help product engineers, marketing and sales drivers and other personnel of a technology company or other entity to create strategies and to design plans and playbooks to help that entity be the front runner in initiating newer business models. Advantageously, the document summarization logic 114 enables summarization based on a document's title and most relevant portions of the content of the document to its title, as determined by following an iterative filtering process. To ensure that the comparison between lines or sentences of the content of the document and the title is of high quality, a doc2vec model trained on a large corpus of text (e.g., the entire English Wikipedia) may be used. The trained doc2vec model is used to convert the title and content of documents to vectors, and then similarity between each line or sentence of the document content and the title may be calculated as described elsewhere herein. The lines or sentences of the document content may be divided into different buckets based on thresholds, such as into high, medium and low buckets using $33^{rd}$ and $66^{th}$ percentiles of the similarity values.

Iterative filtering is applied, such that after a first iteration the content in the high bucket becomes the new title, and the remaining content (e.g., in the medium and low buckets) is compared with it. The high bucket is kept as part of the final summary, and is also made the new title for a subsequent iteration. Sentences in the low and medium buckets are compared with the new title to get a fresh set of high bucket sentences which are added to the final summary. This iterative process continues until the number of sentences in the final summary reaches some threshold size (e.g., half the number of sentences in the original document). Similar sentences in the final summary are then deduplicated, resulting in a final summary output that is more robust due to the multiple iterations. The iterative process also ensures that the final summary output does not miss out on critical information. Further, the document summarization techniques implemented via the document summarization logic 114 are significantly faster than conventional document summarization techniques. In each iteration, the document summarization logic 114 changes the title of the document (e.g., where the new title, new_title, becomes the sentences most similar with the original title of the document or the previous "new_title" resulting from a previous iteration), making the document summarization process more dynamic and the resulting final document summary more logical.

The document summarization logic 114 in illustrative embodiments provides techniques for summarizing documents in an automated manner using an iterative comparison between document content and the title. To do so, each line, sentence or other portion of a document is analyzed to determine if it should be made part of a final summary of the document. In some embodiments, the document summarization logic 114 keeps the following requirements in mind: (1) each sentence of a document is considered for the final summary, and is selected or rejected based on its relevance to the title of the document; and (2) the summarization output is customizable, in that the number of sentences in the final summary can be customized by an end-user (e.g., of one of the client devices 104 requesting the summary).

To generate a summary for a given document, the document summarization logic 114 may perform the following steps:

1. Breaking the content of the document into a list of sentences based on full stops (e.g., punctuation such as periods, line or paragraph breaks, etc.). Consider a document with two sentences" "5G is good for the world. 5G is coming to your city." At this step, this would be broken down into a list of the two sentences ['5G is good for the world', '5G is coming to your city'].
2. The sentences of the document as determined in Step 1 are converted to vectors using a doc2vec model (e.g., trained on a text corpus such as the English Wikipedia). This list of vectors is denoted vec_sentences.
3. The title of the document is converted into a vector denoted vec_title also using the doc2vec model.
4. For each vector of vec_sentences, its cosine similarity with vec_title is calculated. The cosine similarity values are stored in a list denoted cosine_sim_sentences.

5. The sentences are reordered in decreasing order of cosine_sim_sentences, with the most similar sentence (to the title) of the document at the top.
6. The document summary is then generated by:
   A. Generating one or more similarity thresholds, such as a high threshold (denoted $T_{HIGH}$) containing the >66$^{th}$ percentile of cosine_sim_sentences values, a low threshold (denoted $T_{LOW}$) containing the <33$^{rd}$ percentile of cosine_sim_sentences values, and a medium threshold (denoted $T_{MEDIUM}$) containing the remaining cosine_sim_sentences values;
   B. Dividing the sentences of the document into high, medium and low buckets based on where they fall as per their associated cosine_sim_sentences values;
   C. Adding the high bucket sentences to final_summary;
   D. Setting a new value of the title, new_title, equal to the title plus the combined high bucket sentences added to final_summary;
   E. Taking the medium and low bucket sentences as new_sentence, and repeat steps 2-5 with new_sentence and new_title;
   F. Repeating steps A-C to update the final_summary; and
   G. If the number of sentences in final_summary is more than a threshold of the total number of sentences in the document (e.g., more than half), stopping and otherwise continuing again from step D.
7. The final_summary is then output, after optional deduplication of similar sentences if desired.

Figure 4:
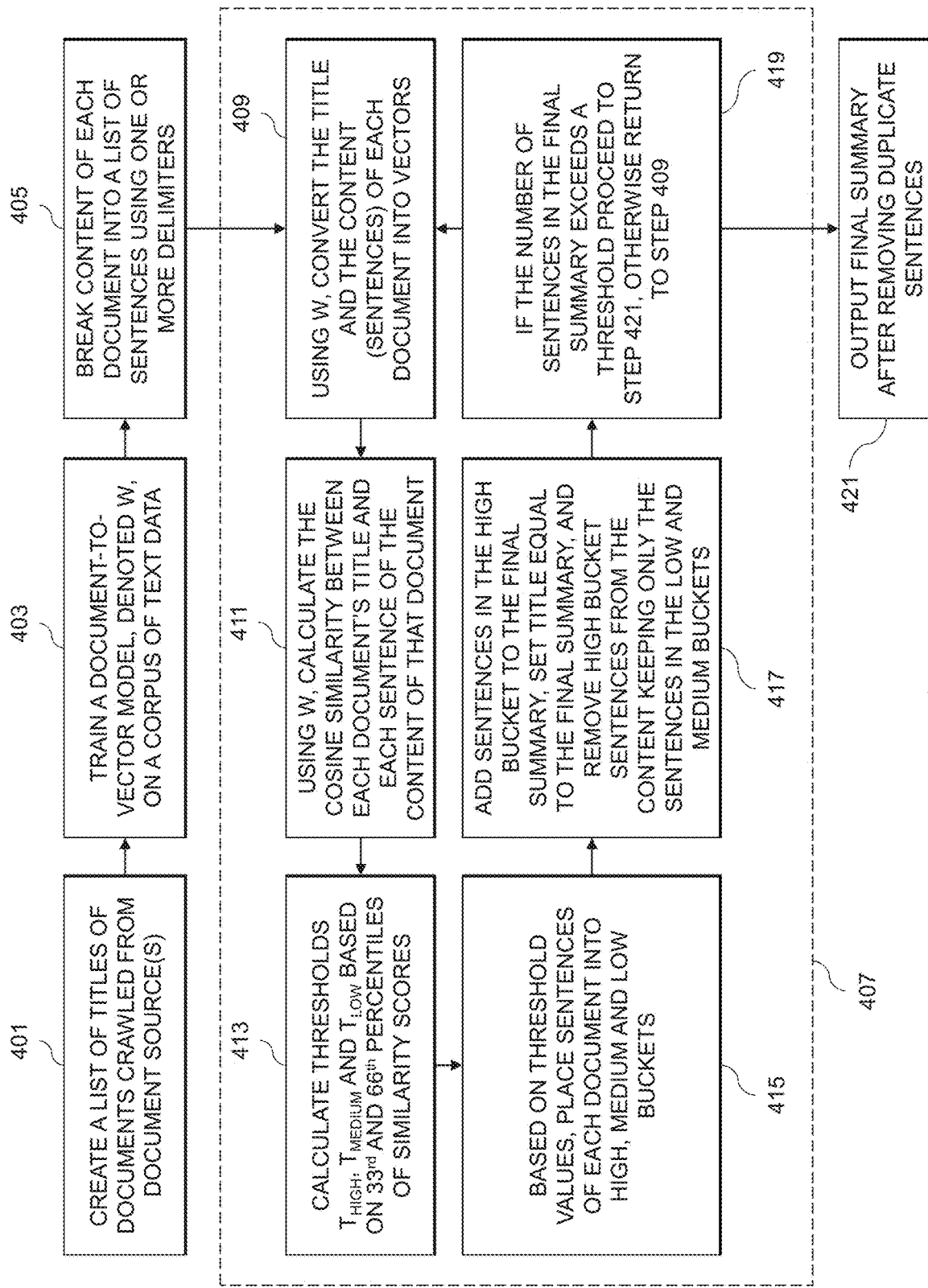
FIG. 4 shows a process flow for generating document summaries in an illustrative embodiment.

FIG. 4 shows an overall process flow for document summarization performed by the document summarization logic 114. In step 401, a list of titles of documents to be summarized, which are crawled from the document sources 106, is created. It should be appreciated that step 401 may be repeated periodically. For example, the document sources 106 may be crawled or checked for any new or updated documents on a regular basis, or in response to an explicit user request or other designated event (e.g., a user request to view or generate a visualization on some aspect term or theme, which triggers crawling for documents relating to that aspect term or theme that should be summarized where such summaries are made part of the generated visualization or otherwise utilized in generating the visualization). In step 403, a document-to-vector (doc2vec) model, denoted W, is trained on a corpus of text data (e.g., the entire English Wikipedia). In step 405, the content of each of the documents is broken down into a list of sentences (or other designated portions) using one or more designated delimiters (e.g., punctuation such as a period, question mark, line or paragraph breaks, etc.).

The FIG. 4 process flow then enters a processing loop 407. The processing loop 407 begins in step 409 with using the model W to convert the title and the content (e.g., sentences) of each document into vectors (e.g., vec_title, vec_sentences). In step 411, the model W is used to calculate the cosine similarity (e.g., cosine_sim_sentences) between each document's title and each sentence of the content of that document. Thresholds are calculated in step 413 based on the similarity scores. In some embodiments, the thresholds include high ($T_{HIGH}$), medium ($T_{MEDIUM}$) and low ($T_{LOW}$) thresholds based on 33$^{rd}$ and 66$^{th}$ percentiles of the similarity scores. In other embodiments, different numbers of thresholds may be used, such as just a single threshold ($T_{CUTOFF}$) that is based on some percentile (e.g., the top 33$^{rd}$ percentile) of the similarity scores. In step 415, the sentences of each document are placed into different buckets based on the threshold values calculated in step 413. For example, the sentences of each document may be placed into a high bucket (e.g., those sentences with the top 33$^{rd}$ percentile of similarity scores), a low bucket (e.g., those sentences with the bottom 34$^{th}$ percentile of similarity scores), and a medium bucket (e.g., those sentences with similarity scores between the 33$^{rd}$ and 66$^{th}$ percentile).

In step 417, sentences in the "highest" bucket (in the example, above, the sentences in the high bucket) are added to the final summary (e.g., final_summary), and the title is updated to be set equal to final_summary. The sentences added to the final summary in this step are removed from the content of the document, keeping only those sentences not added to the final summary as the content of the document (e.g., in this example, the sentences in the medium and low buckets). In step 419, a determination is made as to whether the number of sentences in final_summary exceeds some designated threshold (e.g., half the total number of sentences in the document). It should be appreciated that while various embodiments are described with respect to the designated threshold being a number of sentences (e.g., such as half the total number of sentences in a document), this is not a requirement. In other embodiments, the designated threshold used in step 419 may be an overall length of the final_summary (e.g., a number of characters, lines, sentences, etc., regardless of the total number of sentences that are part of the document). Various other examples are possible. If the result of the step 419 determination is no (e.g., the number of sentences in final_summary is at or below the designated threshold), the FIG. 4 process stays in the loop 407 and returns to step 409 (e.g., with the updated title, new_title and updated content of the document removing those sentences already added to the final_summary). If the result of the step 419 determination is yes (e.g., the number of sentences in final_summary exceeds the designated threshold), the FIG. 4 process flow exits the loop 407 and proceeds to step 421 where the final summary is output after optionally removing duplicate sentences.

An example of document summarization will now be described, for an article with the title "Virtualization and Cloud Management Software Market 2020 Strategic Assessment." FIG. 5A shows a table 500, illustrating the results of a first iteration or first round of the processing loop 407 of the FIG. 4 process flow. The table 500 illustrates the cosine similarity values representing the 66$^{th}$ and 33$^{rd}$ percentiles. The table 505 shown in FIG. 5A illustrates sentences of the document, their associated cosine similarity scores, and the bucket (e.g., high, medium or low) that each sentence is placed in (e.g., according to the values from table 500) during the first round or first iteration. FIG. 5B shows the final summary 510 after the first iteration or first round of the processing loop 407 of the FIG. 4 process flow.

FIG. 6A shows a table 600, illustrating the results of a second iteration or second round of the processing loop 407 of the FIG. 4 process flow. The table 600 illustrates the cosine similarity values representing the 66$^{th}$ and 33$^{rd}$ percentiles. The table 605 shown in FIG. 6A illustrates sentences of the document, their associated cosine similarity scores, and the bucket (e.g., high, medium or low) that each sentence is placed in (e.g., according to the values from table 600) during the second round or second iteration. FIG. 6B shows the final summary 610 after the second iteration or second round of the processing loop 407 of the FIG. 4 process flow. In this example, summarization stops after the second round or second iteration, as the number of sentences in the final summary 610 reaches the designated threshold (the final summary 610 includes half the number of sentences of the document).

An exemplary process for document summarization through iterative filtering of unstructured text data will now be described in more detail with reference to the flow diagram of FIG. 7. It is to be understood that this particular process is only an example, and that additional or alternative processes for document summarization through iterative filtering of unstructured text data can be carried out in other embodiments.

In this embodiment, the process includes steps 700 through 706. These steps are assumed to be performed by the technology trend analysis platform 102 utilizing the document summarization logic 114, the technology trend visualization generation logic 120 and the IT asset configuration logic 122. The process begins with step 700, receiving a query to generate a summary of a document, the document comprising unstructured text data.

In step 702, two or more iterations of filtering of the unstructured text data of the document to produce a current version of the summary of the document are performed. In each of the two or more iterations, performing the filtering of the unstructured text data of the document comprises (i) determining similarity between a first vector representation of the current version of the summary of the document and second vector representations of respective ones of two or more portions of the unstructured text data of the document not yet added to the current version of the summary of the document, (ii) adding at least one of the two or more portions of the unstructured text data of the document not yet added to the current version of the summary of the document to the current version of the summary of the document based at least in part on the determined similarity and (iii) identifying whether one or more designated stopping criteria have been reached.

In a first one of the two or more iterations, the first vector representation comprises a title of the document. In each iteration following the first one of the two or more iterations, the first vector representation comprises the title of the document and one or more portions of the unstructured text data of the document added to the current version of the summary of the document in previous ones of the two or more iterations. The two or more portions of the unstructured text data of the document may comprise sentences.

The first vector representation and the second vector representations may be generated utilizing a document to vector model. Determining similarity between the first vector representation of the current version of the summary of the document and the second vector representations of respective ones of the two or more portions of the unstructured text data of the document not yet added to the current version of the summary of the document may comprise computing a cosine similarity between the first vector representation and each of the second vector representations. Adding said at least one of the two or more portions of the unstructured text data of the document not yet added to the current version of the summary of the document to the current version of the summary of the document based at least in part on the determined similarity may comprise, for each of the two or more iterations: calculating at least one threshold cosine similarity value; and selecting respective ones of the two or more portions of the unstructured text data of the document having cosine similarity values exceeding the at least one threshold cosine similarity value to add to the current version of the summary of the document.

A final version of the summary of the document is generated in step 704 following identification of the one or more designated stopping criteria in a given one of the two or more iterations. The one or more designated stopping criteria may comprise a threshold number of the two or more iterations, identifying that a size of the current version of the summary of the document exceeds a designated threshold size (e.g., a designated threshold number or proportion of the two or more portions of the unstructured text data of the document), a designated threshold length (e.g., in words, characters, etc.), combinations thereof, etc. Step 704 may comprise performing deduplication of the portions of the unstructured text data of the current version of the summary of the document.

The final version of the summary of the document is generated in step 704 based at least in part on the current version of the summary of the document produced in the given one of the two or more iterations. In step 706, a response to the query is provided. The response to the query comprises the final version of the summary of the document.

In some embodiments, the document comprises at least one of a support chat log and a support call log associated with a given IT asset of an IT infrastructure. The FIG. 7 process may further comprise identifying a recommended troubleshooting action for the given IT asset based at least in part on the response to the query and performing the recommended troubleshooting action on the given IT asset. The recommended troubleshooting action may comprise at least one of a diagnostic action and a repair action. The given IT asset may comprise a computing device, and the recommended troubleshooting action may comprise modifying at least one of: one or more software components of the computing device; and one or more hardware components of the computing device.

Figure 7:
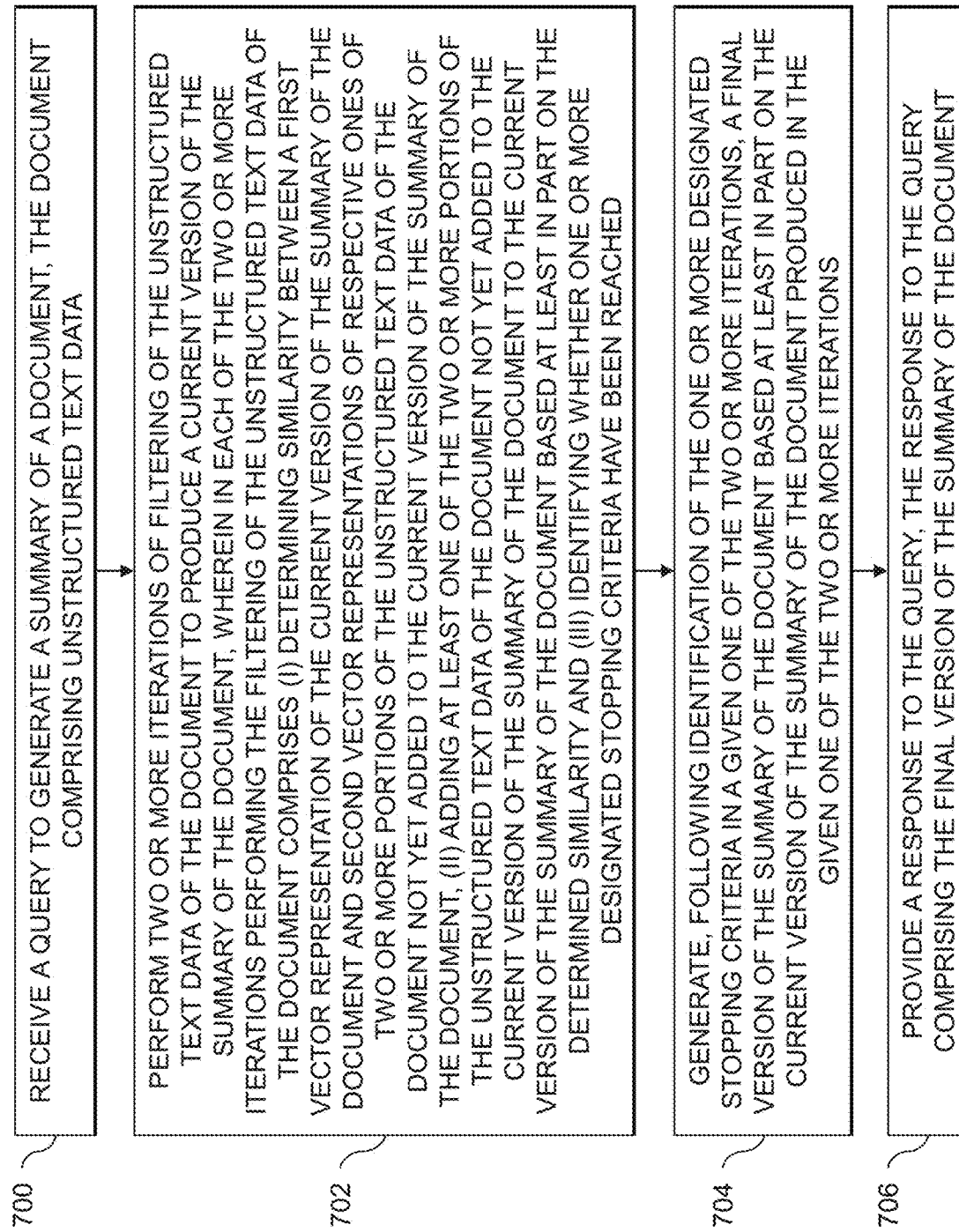
FIG. 7 is a flow diagram of an exemplary process for document summarization through iterative filtering of unstructured text data of documents in an illustrative embodiment.

In other embodiments, the document comprises at least one of an article, a survey and social media content associated with one or more IT asset types, and the FIG. 7 method may further comprise adjusting investment by an entity in the one or more IT asset types based at least in part on the given sentiment classification, modifying configurations of IT assets in an information technology infrastructure having the one or more types of IT asset types based at least in part on the given sentiment classification, combinations thereof, etc.

The technology trend analysis platform 102 may be further used to extract themes or aspect terms from documents (or document summaries produced using the document summarization logic 114) collected from the document sources 106, and to determine sentiments of the extracted aspect terms in the documents. Traditional approaches to sentiment analysis generate sentiments at an article or document level, thereby overlooking the granular need for classifying sentiment at an aspect term level. Models for aspect-based sentiment analysis typically work only on simple sentences, where the sentiment in a single sentence is unidirectional and the sentence has no more than one aspect term. These models mostly rely on pre-built attention modules as part of pre-trained Bidirectional Encoder Representations from Transformers (BERT) and other transformer-based models. Such approaches lack the ability to determine the context in which aspect terms appear in each sentence in conjunction with their sentiments. Real-world sentences in articles or other types of unstructured text documents make existing models even more difficult to use, as the text is more complex with multiple aspect terms and sentiments being multidirectional in each sentence.

The technology trend analysis platform 102, utilizing the aspect term sentiment analysis logic 116, is able to solve such complexities accurately with an AI model trained to classify the sentiments of aspect terms based on a contextual understanding of the aspect terms in conjunction with the sentiment within each sentence or other portion of a document. The aspect term sentiment analysis logic 116 in some embodiments utilizes a concept referred to as "context retainer" for determining sentiments for aspect terms. The context retainer is built using self-attention with weights that vary based on the distance of each word from an aspect term. The context retainer may be layered on top of BERT-based transfer learning. The context retainer may be trained with the capability of factoring in the context in which the aspect terms present themselves in each sentence of a document. Using this model, the aspect term sentiment analysis logic 116 can outperform (e.g., by 10% or more) state-of-the-art sentiment analysis leaderboard models (e.g., using publicly available Semantic Evaluation (SemEval) data) on accuracy metrics, both in extracting aspect terms and on classifying the sentiment of extracted aspect terms.

Aspect term extraction and sentiment analysis may be used in a wide variety of application areas. Consider, as an example, a company or other entity that offers various technology products and services to customers. The technology trend analysis platform 102, using the aspect term sentiment analysis logic 116, provides functionality for aspect term-based sentiment analysis, adding significant value for such an entity. For example, internal sales makers, product engineers, product marketing staff, etc. may utilize aspect term-based sentiment analysis to infer the tone of sentiments across themes or aspect terms of interest (e.g., various technology domains, such as 5G, edge computing, biocomputing, AI, deep learning, quantum computing, etc.). This may be further used for inferring the tone of sentiments for an entity's competitors (e.g., other technology product and service vendors) across the aspect terms for any applicable technology domain of interest. This can in turn help an entity (e.g., decision makers thereof) to understand where that entity stands on the technology curve of various emerging and innovative technology domains, and may be used to drive strategy to compete and stay ahead in a data-driven and scientific way.

As noted above, aspect term extraction and sentiment analysis may be applicable in any generic domain in which it is desired to perform sentiment analysis (e.g., for unstructured text documents obtained from document sources 106 by the technology trend analysis platform 102 using the source interface 112). While some embodiments are described with respect to use of the technology trend analysis platform 102 by an entity that is a technology company, in other embodiments the technology trend analysis platform 102 may be used by entities which are not technology companies. The functionality provided by the aspect term sentiment analysis logic 116 for identifying themes or aspect terms in unstructured text data and determining their sentiments using a context retainer may be applied or used by various other types of entities in other domains. The models used in some embodiments are domain-agnostic and highly scalable, since training of the models is focused not on a particular technology domain, but on semantics for extracting aspect terms and predicting associated sentiments. Further, the models have the ability to extract aspect terms in natural language text and can advantageously be used in classifying new, un-labeled textual data into categories and classes for training a multi-class classification problem.

The aspect term sentiment analysis logic 116 provides functionality for extracting themes or aspect terms in unstructured text data, and for determining sentiment polarities at an aspect term level using a context retainer. The context retainer, which utilizes a dynamic weighted approach, is a variant of self-attention. Extracting aspect terms and determining their sentiments is a complex task which is easier said than done, as each natural language text article, blog, survey, review or other document may have multiple themes and multi-direction sentiments across those themes. As used herein, an "aspect term" refers to a word or phrase that is being spoken about in a particular unstructured text document (e.g., a technology article, blog, etc.).

In some embodiments, both tasks performed by the aspect term sentiment analysis logic 116—aspect term extract and prediction of sentiments for extracted aspect terms, are performed using BERT models that are trained in parallel by averaging out the BERT encodings of the aspect terms from both of the models. An adjusted weight variant of a self-attention model is used to ensure that the context of attributing words is retained accurately on determining self-attention encodings of the aspect terms. Such functionality is provided using a context retainer block. To ensure that the right attributing words are accurately identified in a given sentence or other portion of a document that are acting upon an aspect term to accurately predict sentiments, the adjusted weight variant of the self-attention model gives a higher weightage to words which are closer to an aspect term and lower weightage to words that are farther from the aspect term. The weights may be assigned using a logarithmic weight adjusting factor.

The aspect term sentiment analysis logic 116 provides the ability to process each aspect term one at a time, to ensure that the sentiments are determined at an aspect term level within each sentence. Where a sentence or other portion of a document has multiple aspect terms, this is achieved by intelligently chunking the sentence or other portion of the document into sub-parts. In some embodiments, each sub-part includes all words before and after an aspect term until a previous or next aspect term is discovered. This provides a forced disabling of inputs approach, where the words which are not relevant are essentially not processed in the current iteration of the deep neural network.

Focused aspect term classification is achieved using a multiple-level classification model for sentiments. In some embodiments, a three-level classification model is used which classifies the sentiment of each aspect term as positive, neutral, or negative. In other embodiments, more or fewer than three different levels of sentiment types may be used. It should be noted that if an aspect term is a phrase (e.g., multiple words), the aspect term sentiment analysis logic 116 averages out each of the token or word embeddings to feed into the classification model while all other encoded words are ignored.

In some embodiments, the aspect term sentiment analysis logic 116 utilizes a deep learning based solution (e.g., using pre-trained BERT models) that extracts all themes or aspect terms from unstructured text data, and determines sentiment polarities of each aspect term (e.g., as either positive, negative or neutral sentiment). As used herein, "polarity" refers to the tone of a certain natural language document (or portion thereof), including whether the tone is positive, negative or neutral. To do so, the aspect term sentiment analysis logic 116 utilizes a context retainer that implements self-attention and a logarithmic weighting mechanism to ensure that words that attributed to the sentiment of an aspect term are attended by, with higher degree, as against other irrelevant words around an aspect term. In other words, this approach refines attention weights with logarithmic values based on the distance and relevance of words around aspect terms, ensuring that the context of sentiments are retained for every aspect term while annotating them with their appropriate sentiments. The unstructured text data being analyzed may include, but is not limited to, articles, blog posts, social media comments, patents, scientific journals and various other types of documents. Topic terms or themes (e.g., words or phrases that are being spoken about in a textual document), which are more generally referred to herein as aspect terms, are mined and then the sentiments or polarities of the same are determined in a document.

The aspect term sentiment analysis logic 116 in some embodiments gathers multiple documents (e.g., articles, blog posts and other types of documents including unstructured text data) from the document sources 106 using the source interface 112. The aspect term analysis logic 116 then trains models for two tasks: (1) extracting aspect terms; and (2) determining sentiments of the extracted aspect terms. The first task, extracting aspect terms, includes identifying aspect terms (e.g., words or phrases that are being spoken about in each document). To do so, a training data set (e.g., containing around 2,500 articles spanning various technology domains) is created, and each word in each article is tagged as either an aspect term or a non-aspect term. A first model is used to train a token classification model on the training data set. The token classification model will therefore have the intelligence to extract aspect terms for a given new document regardless of domain, as the intelligence built into the token classification model is about aspect term extraction but not domain learning thanks to including a wide variety of examples in the training data set. The token classification model, when tested, is able to separate out aspect terms from non-aspect terms (e.g., with a 94% F1 score and accuracy).

Figure 8A:
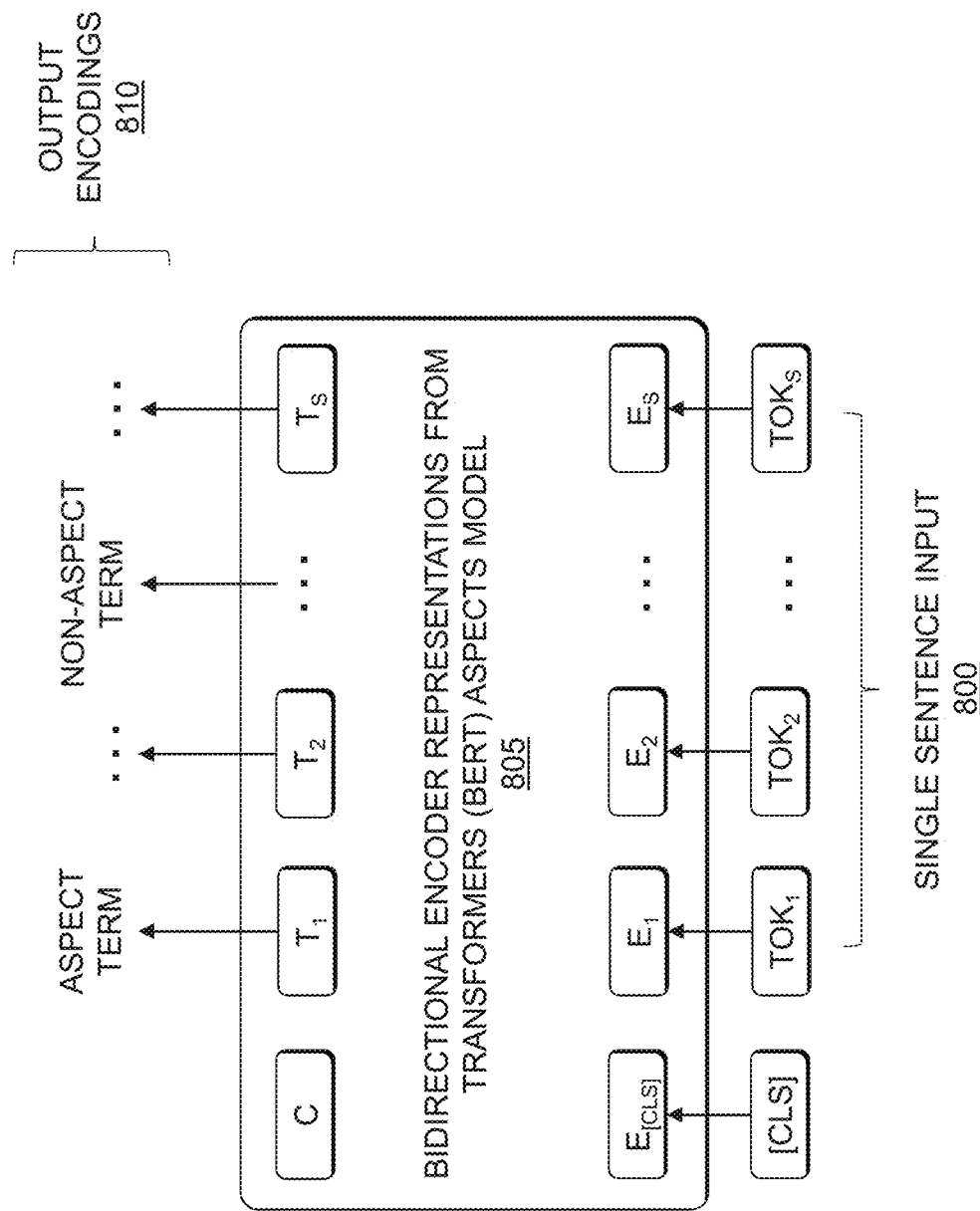
FIGS. 8A-8C show a deep learning architecture for aspect term extraction and sentiment prediction in an illustrative embodiment.

FIG. 8A shows an example of the first model, implemented using a BERT architecture, which is referred to as a BERT Aspects model 805. The BERT Aspects model 805 receives a single sentence input 800, where the input text starts with a token "[CLS]" and includes a set of tokens $TOK_1$, $TOK_2$, ... $TOK_S$ representing a single sentence. The BERT Aspects model 805 determines embeddings $E_{[CLS]}$, $E_1$, $E_2$, ... $E_S$, as well as output C, $T_1$, $T_2$, ... $T_S$. The output C represents a class label for the input sentence 800. The outputs $T_1$, $T_2$, ... $T_S$ correspond to words of the sentence, and the output encodings 810 indicate whether each of such words is an aspect term or not.

Figure 8B:
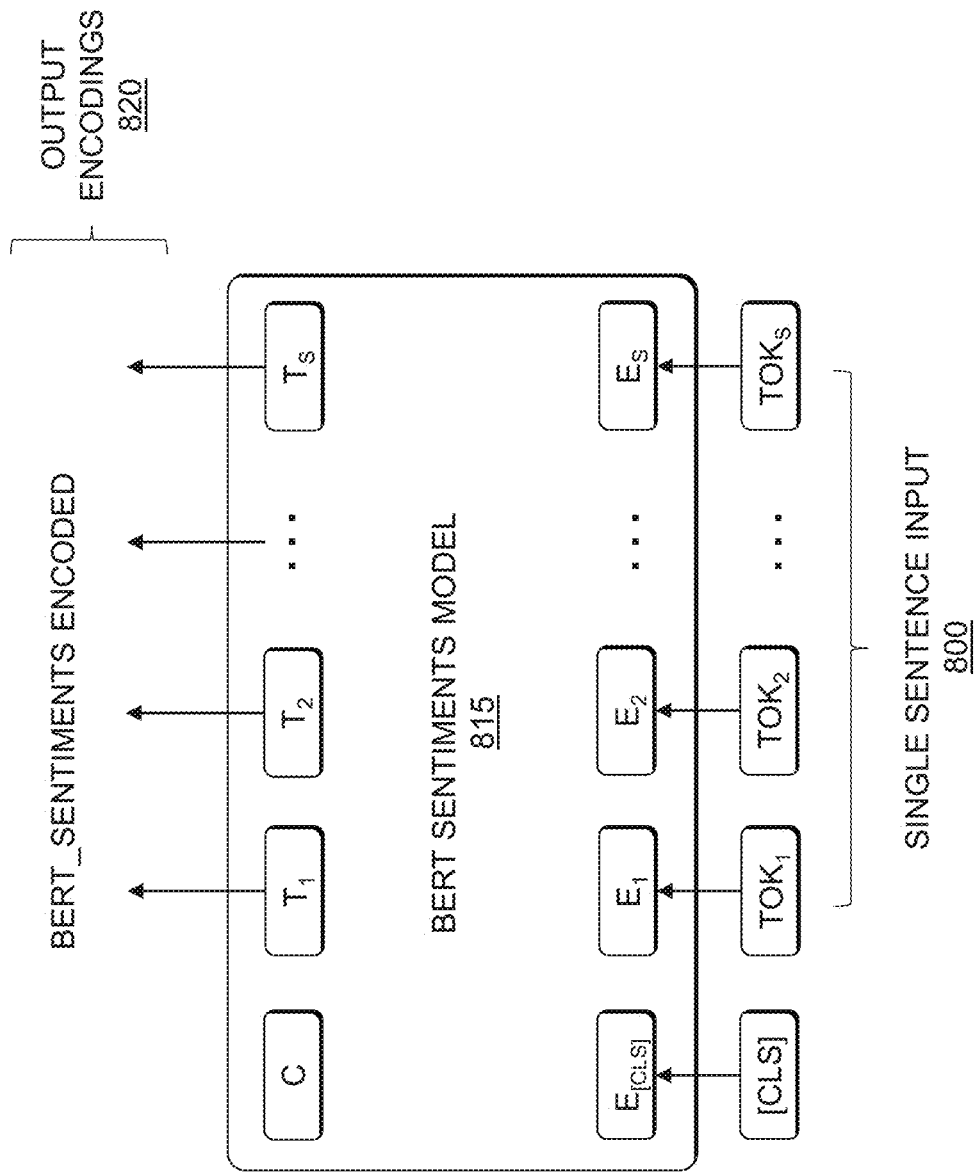

The second task, predicting sentiments of the extracted aspect terms, may be performed as a parallel downstream transfer learning tasking using BERT and a novel concept referred to herein as a context retainer. The context retainer uses a second model for fine-tuning sentiment classification of aspect terms. The second model, similar to the first model, may be BERT-based. FIG. 8B shows an example of the second model, implemented using a BERT architecture, which is referred to as a BERT Sentiments model 815. The BERT Sentiments model 815 shown in FIG. 8B receives the same input 800 as the BERT Aspects model 805 shown in FIG. 8A. Rather than classifying each token as an aspect term or a non-aspect term, the BERT Sentiments model 815 provides, as output encodings 820, sentiment encodings referred to as BERT_Sentiments.

Figure 8C:
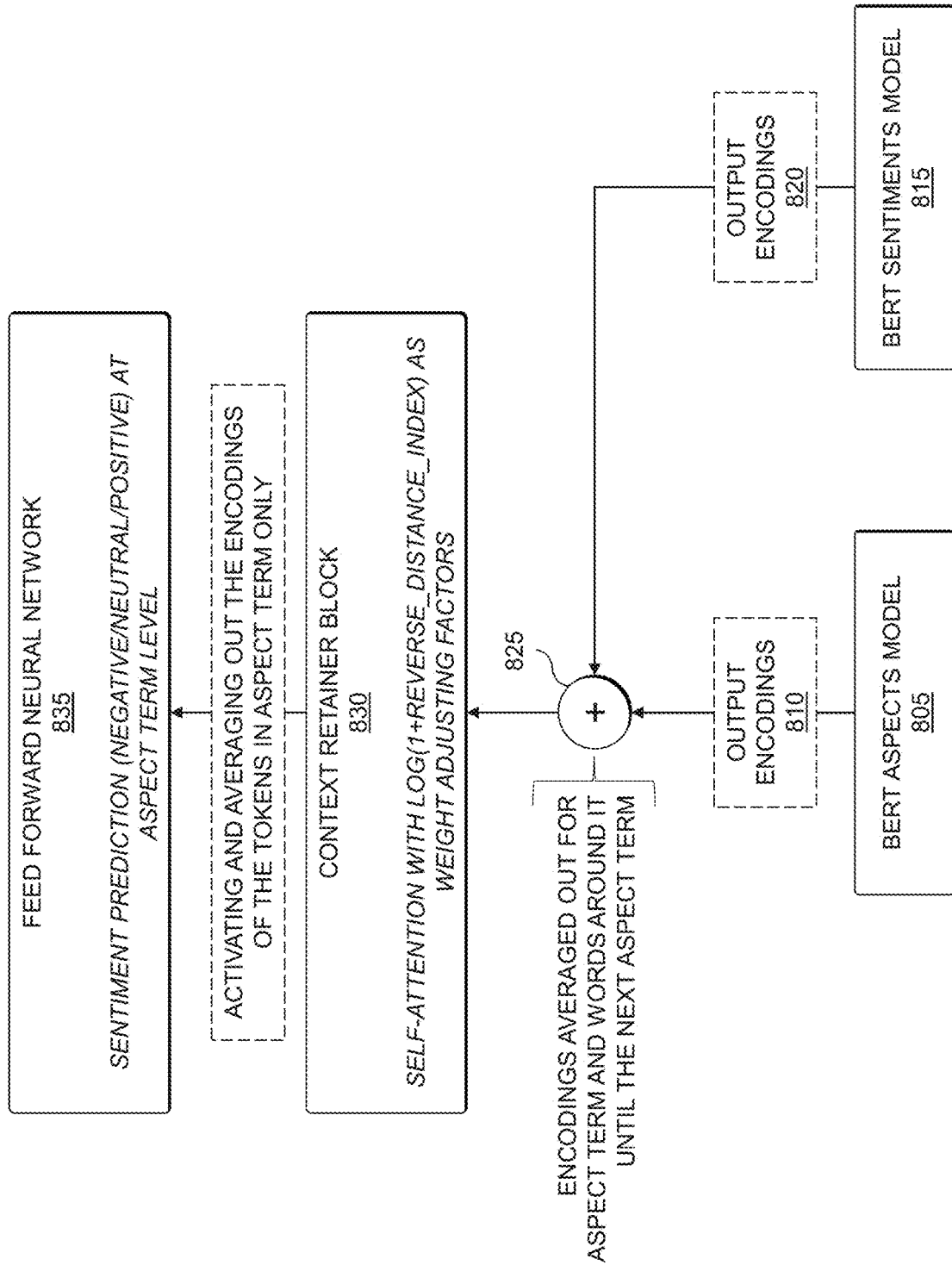

FIG. 8C shows an overall architecture, illustrating how the output encodings 810 and 820 from the BERT Aspects model 805 and the BERT Sentiments model 815 are combined to predict sentiments for extracted aspect terms. The input 800 (not shown in FIG. 8C) is encoded by the BERT Aspects model 805 transformers to produce the output encodings 810, and by the BERT Sentiments model 815 transformers to produce the output encodings 820. In adder 825, the output encodings 810 from the BERT Aspects model 805 are averaged out (e.g., for each aspect term with the words around it until the next aspect term) with the output encodings 820 from the BERT Sentiments model 815. The resulting averaged encodings are sent to a context retainer block 830, which implements self-attention with weights whose values rely on the distance of words from an aspect term, and also on the relevance of a word specific to the context of what is being spoken about the aspect term. As illustrated in FIG. 8C, the self-attention may use logarithmic weights (e.g., log(1+reverse_distance_index)) as weight adjusting factors.

The output of the context retainer block 830 is provided to a downstream sentiment classifier, shown in FIG. 8C as a feed forward neural network block 835. The feed forward neural network block 835 performs sentiment prediction (e.g., negative, neutral, positive) at the aspect term level. The sentiments are advantageously trained for each aspect term at a time (e.g., by activating and averaging out the encodings of the tokens for one aspect term only). For example, an article or other document having four aspect terms will separately train the BERT Sentiments model 815 for each of the four aspect terms, one at a time. Therefore, even while inferencing, the sentiment is predicted in block 835 one aspect term at a time. In this way, both aspect term extraction (e.g., as provided by the output encodings 810 from the BERT Aspects model 805) and sentiment classification (e.g., as provided in part by the output encodings 820 from the BERT Sentiments model 815) are performed at an aspect term level with the context retainer block 830 achieving improved accuracy (e.g., 94% or greater).

Figure 9:
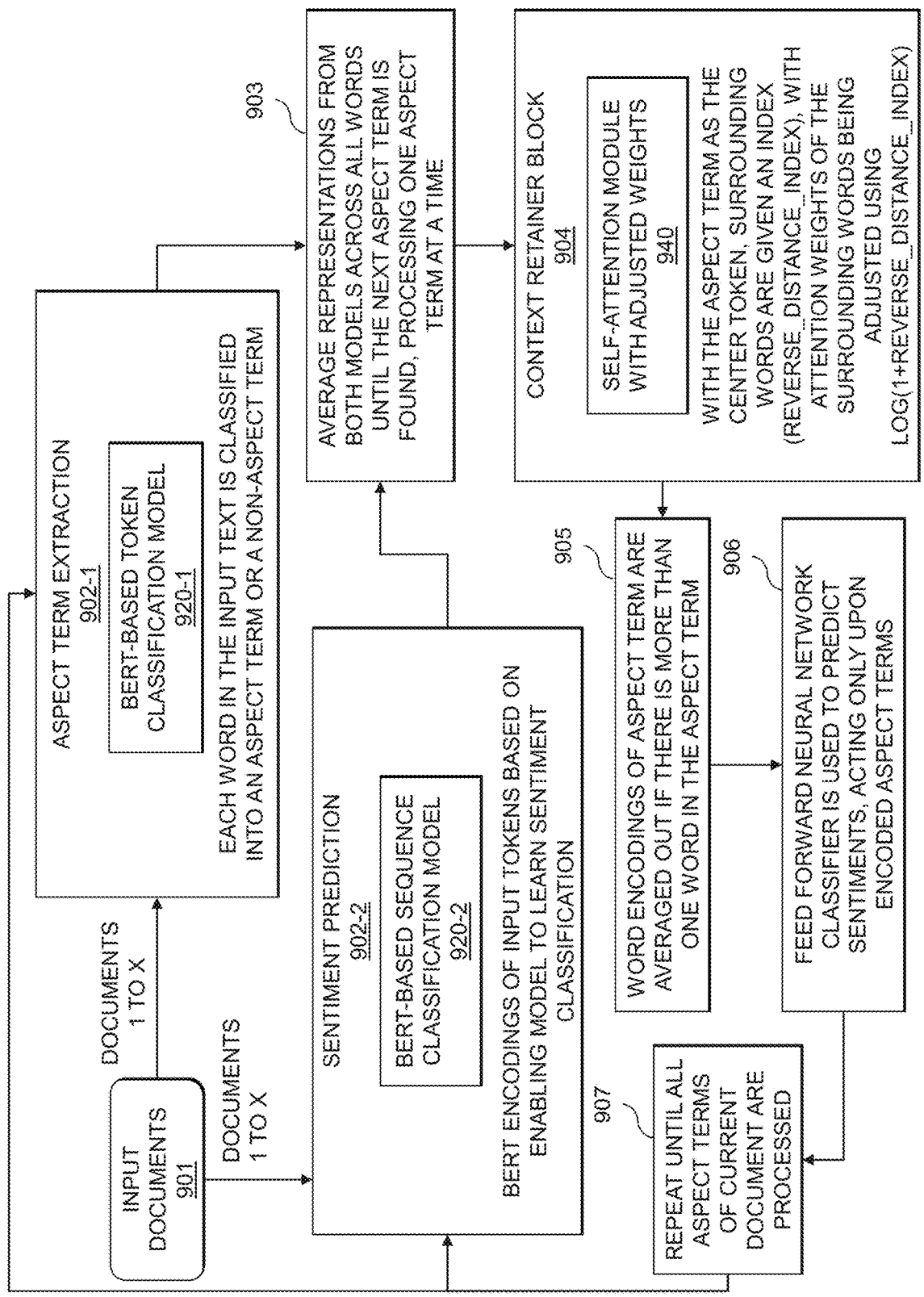
FIG. 9 shows a process flow for aspect term extraction and sentiment prediction in an illustrative embodiment.

FIG. 9 shows an overall process flow for aspect term extraction and sentiment prediction. In step 901, a set of input documents 1 to X is used, where each of the input documents is inferred one at a time. In step 902-1, each word in a given one of the input documents is classified as either an aspect term or a non-aspect term using a BERT-based token classification model 920-1 (e.g., the BERT Aspects model 805 described above). It should be noted that there may be more than one aspect term in each document or portion thereof (e.g., there may be multiple aspect terms in a given sentence of a document). The portion of the text of the given document that gets processed in subsequent steps is a trimmed portion of the given document (e.g., a trimmed sub-sentence) between a previous aspect term and the current aspect term being analyzed. Token classification of each word in the trimmed portion (e.g., the trimmed sub-sentence) by the BERT-based token classification model 920-1 encodes the words themselves. Step 902-2, which may be performed in parallel with step 902-1, uses a BERT-based sequence classification model 920-2 (e.g., the BERT Sentiments model 815 described above) to encode the same words. BERT encodings of the input tokens are produced based on enabling the BERT-based sequence classification model 920-2 to learn sentiment classification.

The overall processing of the FIG. 9 process flow proceeds sequentially from steps 902-1 and 902-2 (collectively, step 902), one aspect term at a time. In step 903, the encodings output by the BERT-based token classification model 920-1 and the BERT-based sequence classification model 920-2 in steps 902-1 and 902-2, respectively, are averaged out. The representations from both the models are averaged out across all words until the next aspect term is found, processing one aspect term at a time. The averaged-out encodings produced in step 903 are sent to a context retainer block in step 904. The context retainer block 904 implements a self-attention module 940 with adjusted weights, where the self-attention module 940 has the ability to influence the attention weights on an aspect term based on the distance of a word from the aspect term (e.g., using a logarithmic weight adjusting factor). With the aspect term as the center token, surrounding words are given an index (e.g., reverse_distance_index), with attention weights of the surrounding words being adjusted using log(1+reverse_distance_index).

As noted above, it is possible for an aspect term to be a phrase (e.g., multiple words). In such a case, separate encodings will be produced for each word of the aspect term. In step 905, the different word encodings of the aspect term are averaged out if there is more than one word in the aspect term. If the aspect term is a single word, step 905 may be skipped. The final aspect term encodings (e.g., from step 905 if there is more than one word in the aspect term, from step 904 if the aspect term is a single word) are provided to a feed forward neural network classifier in step 906. The feed forward neural network classifier predicts the sentiment for the aspect term, acting only upon encoded aspect terms. In some embodiments, step 906 includes predicting the sentiments of each aspect term as positive, negative or neutral. In step 907, steps 902 through 906 are repeated for the next aspect term in the given document. Once all of the aspect terms in the given document have been processed, the next document is taken up until sentiment prediction has been performed for all aspect terms of all of the input documents 901.

Traditional sentiment analysis methods generate sentiments at an article or overall document level, thereby overlooking the granular need for classifying sentiment at an aspect term level (e.g., considering that, within a document having multiple aspect terms, different aspect terms may have different associated sentiments). Conventional aspect-based sentiment analysis models typically work well only for simpler sentences where the sentiment is unidirectional and where each sentence has only a single aspect term. These models mostly rely on pre-built attention modules within pre-trained BERT and other transformer-based pre-trained models. Such an approach lacks the ability to treat the context in which aspect terms appear in each sentence in conjunction with their sentiments. Real-world sentences in articles or other documents with unstructured text data make existing models even more difficult to use, as these texts are more complex with more than one aspect term and the sentiments being multi-directional in each sentence. Therefore, there is a need for improved methods to give entities accurate directions and actions to pursue. The approaches implemented using the aspect term sentiment analysis logic 116 as described herein meet these and other needs.

The aspect term sentiment analysis logic 116 may be used in various different application areas. Consider, as an example application area, a technology entity that wishes to analyze news articles (or other types of documents) on various technological concepts (e.g., blockchain-based cloud applications) and/or themes (e.g., decentralization, privacy, data ownership, scalability, etc.) The technology entity may utilize the technology trend analysis platform 102, and more specifically the aspect term sentiment analysis logic 116 thereof, to extract aspect terms from such articles that relate to these themes, and to infer their associated sentiments. This can help the technology entity to summarize the pros and cons of, for example, decentralized cloud as per what the industry and business community thinks, which can guide the technology entity in the right strategic direction (e.g., towards investment plans on blockchain as a technology).

Figure 10:
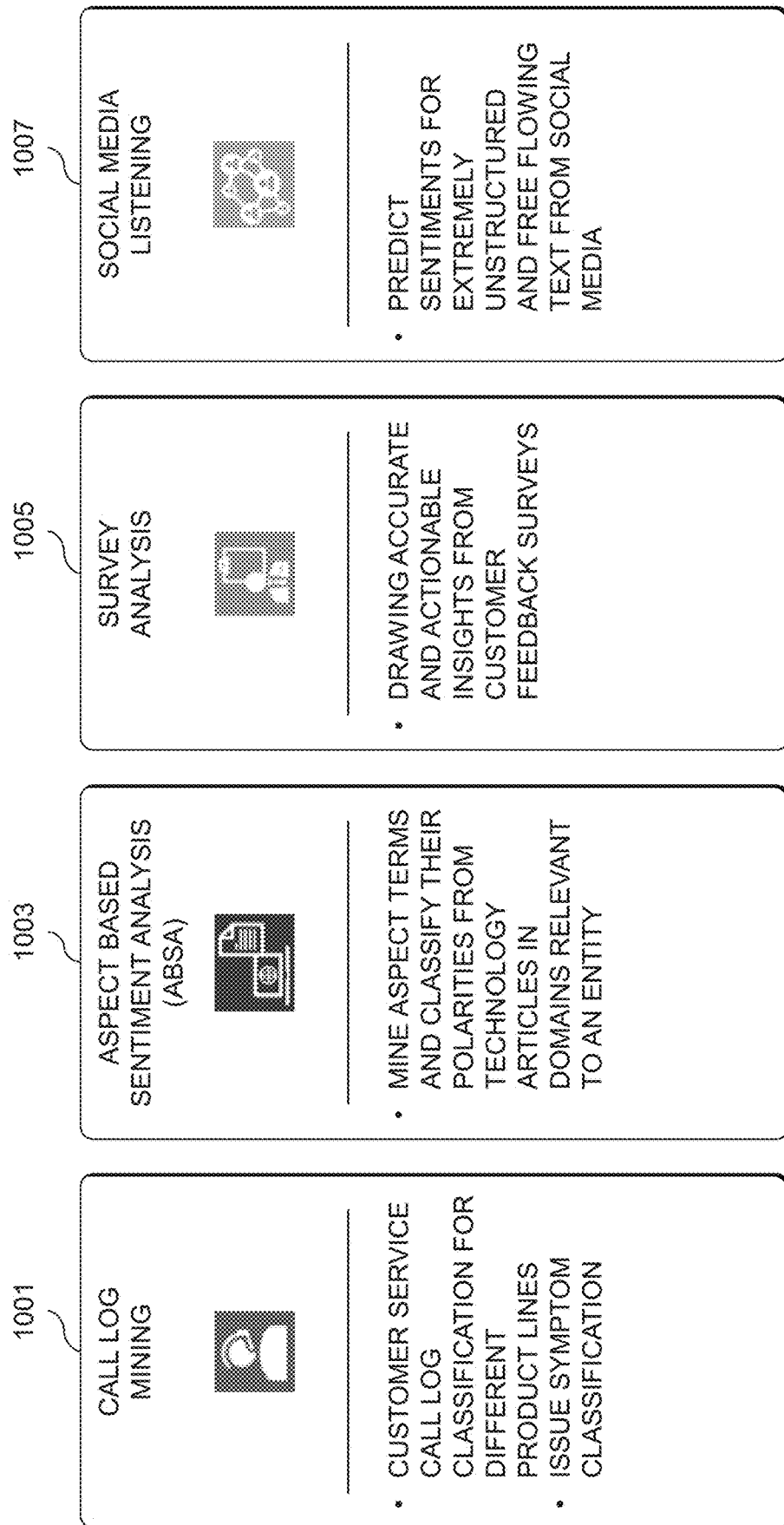
FIG. 10 shows use case scenarios for aspect term extraction and sentiment prediction in an illustrative embodiment.

Sentiment analysis methods may be used to analyze customer reviews (e.g., from various online stores), social media comments, critic reviews, etc. This is particularly useful for various groups or teams within an entity, including for tasks such as product engineering and for product group teams to draw necessary actionable insights to decide on product price moves, product quality, engineering, validating marketing efforts, etc. FIG. 10 illustrates various application areas for trend analysis which can benefit from the use of the aspect term extraction and sentiment prediction functionality provided by the aspect term sentiment analysis logic 116 of the technology trend analysis platform 102. As illustrated in FIG. 10, use cases include call log mining 1001, aspect based sentiment analysis (ABSA) 1003, survey analysis 1005, and social media listening 1007. Call log mining 1001 may include customer service call log classification (e.g., for different product lines), issue symptom classification, etc. ABSA 1003 may include mining aspect terms and classifying their polarities from technology articles or other documents in domains of relevance to an entity (e.g., such as edge computing, virtualization, cloud, etc.). Survey analysis 1005 may include drawing accurate and actionable insights from customer feedback surveys. Social media listening 1007 may include predicting sentiments for extremely unstructured and free flowing text from social media sources.

Across the above-described and various other application areas, use of the techniques described herein for aspect term extraction and sentiment prediction can provide various advantages, including but not limited to: quicker turnaround (e.g., 95% time saved); not requiring manual intervention; beating industry benchmark accuracy (e.g., greater than 94%); providing a multi-domain and multi-use case solution; and scalability. The techniques described herein for aspect term extraction and sentiment prediction may be scaled to and tested for client product reviews, server and client call log issue classification, analysis of technology articles (e.g., big data, AI, etc.), etc. Various types of end-users may utilize the aspect term extraction and sentiment prediction functionality described herein, such as product marketing and engineering teams, product quality teams, tech support teams, center of competency teams, etc.

To ensure that the aspect term sentiment analysis logic 116 accurately identifies the right attributing words in a given sentence that are associated with an aspect term to accurately predict its associated sentiments, an adjusted weights variant of a self-attention model may be used which ensures that words which are closer to the aspect term are given higher weights and words which are farther from the aspect term are given relatively lower weights (e.g., by using a logarithmic weight adjusting factor). This ensures that the context of attributing words is retained accurately for determining self-attention encodings of the aspect terms using the context retainer. Further, embodiments provide the ability to process one aspect term at a time to ensure that sentiments are determined for each aspect term. This is done intelligently by chunking sentences into sub-parts which include all the words before and after an aspect term or phrase until the previous or next aspect term is discovered. This advantageously provides a forced-disabling of inputs which are not relevant for processing in the current iteration of the deep neural network.

Consider, as an example, a portion of an article or other text document on blockchain technology. FIG. 11 shows an example 1100 of a portion of the text of such a document. During inference, as noted above, two tasks are performed: aspect term extraction and sentiment determination for the extracted aspect terms. The text shown in the example 1100 of FIG. 11 may be trained as a token classification model using a first model (e.g., BERT Aspects model 805) that classifies each word or token into either an aspect term or a non-aspect term. As noted above, this first model may be trained on a large number (e.g., thousands, such as 2,500) of manually classified datasets across multiple domains (e.g., 3D printing, 5G, blockchain, deep learning, IoT, autonomous vehicles, cyber security, etc.). The first model (e.g., BERT Aspects model 805) extracts the following as aspect terms from the document portion 1100, which are highlighted in bold in FIG. 11: blockchain; distributed authentication; accounting technologies; ICT; FinTech; traditional banking; decentralized authentication; telecom and computing; investing/trading; and supply chains. Most of these aspect terms have more than one word, and each word of the aspect term will have one encoding each from the first model (e.g., BERT Aspects model 805).

The second task is to predict sentiments of the aspect terms. This a parallel downstream transfer learning task using a second model (e.g., BERT Sentiments model 815) and a context retainer (e.g., context retainer block 830). This second model (e.g., BERT Sentiments model 815) is utilized for fine-tuning sentiment classification of aspect terms, with the first step being encoding the input using BERT_Sentiments transformers. The tokens which are classified as aspect terms from the first model (e.g., BERT Aspects model 805) in the first task have a certain encoding of their own, with such encoding values being averaged out with the encoded vectors from the second model (e.g., BERT Sentiments model 815). The sentiment, however, is trained for each aspect term at a time (such that if there are multiple aspect terms, the second model will train on one aspect term at a time even while inferencing).

Continuing with the FIG. 11 example, the first aspect term has one token (e.g., blockchain) which will have two encodings, a first encoding from the first model (e.g., BERT Aspects model 805) and a second encoding from the second model (e.g., BERT Sentiments model 815). These two encodings will be averaged out (e.g., in adder 825) and are further processed as part of the context retainer (e.g., context retainer block 830). From a context retainer methodology standpoint, the encoded vectors of all tokens from the second aspect term (e.g., distributed authentication) onwards are forced to zero. Then there is a self-attention set up as part of the context retainer block (e.g., context retainer block 830), which acts upon an average encoding from the two parallel models (e.g., BERT Aspects model 805 and BERT Sentiments model 815) of the term "blockchain" and all the words around it. The words surrounding the aspect term "blockchain" will apply themselves to compute self-attention encodings.

In a document, words may be attributing sentiment to aspect terms before or after them, and therefore some embodiments use a log(1+reverse_distance_index) as a weight adjusting factor for the attention weights. This ensures that the right words are attributed to the right aspect terms. In the sentence "Blockchain and related distributed authentication and accounting technologies are poised to transform ICT, and in so doing, causing substantial disintermediation across a wide variety of industry verticals" in the FIG. 11 document example 1100, the word "verticals" will have a reverse_distance_index of 1, and the word "industry" will have a reverse_distance_index of 2, and so on until the word "and" (the one beside the word blockchain) which has a reverse_distance_index of 26. The attention weights adjusting factor will be higher for "transform" as compared to "doing."

Following the context retainer (e.g., context retainer block 830), which is embedded with a self-attention module, a feed forward neural network with a three category classifier (e.g., feed forward neural network 835) is used to predict the sentiment of each aspect term as negative, neutral or positive. An important point to be made here is that the feed forward neural network acts upon the average of just the aspect term tokens context retained encoded embeddings. These steps are repeated for all aspect terms individually while training in a given article or other document. The accuracy of the sentiment prediction in a test dataset was recorded as over 94%. In the FIG. 11 example, the aspect terms blockchain, distributed authentication, accounting technologies, investing/trading, and supply chains are classified as having positive sentiment, the aspect terms ICT, FinTech, traditional banking, and decentralized are classified as having neutral sentiment, and the aspect term telecom and computing is classified as having negative sentiment.

An exemplary process for sentiment analysis for aspect terms extraction from documents having unstructured text data will now be described in more detail with reference to the flow diagram of FIG. 12. It is to be understood that this particular process is only an example, and that additional or alternative processes for sentiment analysis for aspect terms extraction from documents having unstructured text data can be carried out in other embodiments.

In this embodiment, the process includes steps 1200 through 1210. These steps are assumed to be performed by the technology trend analysis platform 102 utilizing the aspect term sentiment analysis logic 116, the technology trend visualization generation logic 120 and the IT asset configuration logic 122. The process begins with step 1200, receiving a query to perform sentiment analysis for a document, the document comprising unstructured text data.

In step 1202, a first set of encodings of the unstructured text data of the document is generated utilizing a first machine learning model. The first set of encodings classifies each of the words of the unstructured text data of the document as being an aspect term or a non-aspect term. In step 1204, a second set of encodings of the unstructured text data of the document is generated utilizing a second machine learning model. The second set of encodings classify sentiment of each of the words of the unstructured text data of the document. The first machine learning model may comprise a BERT token classification model, and the second machine learning model may comprise a BERT sequence classification model. The first machine learning model may be pretrained using a plurality of documents associated with a plurality of different technology domains, and the second machine learning model may be trained individually for each of the one or more words classified as an aspect term in the first set of encodings.

The FIG. 12 process continues in step 1206 with determining, for a given aspect term corresponding to a given sequence of one or more of the words of the unstructured text data of the document classified as an aspect term in the first set of encodings, attention weights for a given subset of words in the unstructured text data surrounding the given sequence of the one or more words. The given subset of the words in the unstructured text data surrounding the given sequence of the one or more words may comprise (i) a first subset of words prior to the given sequence of the one or more words until a previous aspect term or a beginning of the document is reached and (ii) a second subset of words following the given sequence of the one or more words until a next aspect term or an end of the document is reached. Step 1206 may comprise assigning index values to each of the words in the first subset and the second subset according to their respective distance to the given sequence of the one or more words, and computing the attention weight for each of the words in the first subset and the second subset based at least in part on a logarithmic weight adjusting factor determined using the index values assigned to each of the words in the first subset and the second subset.

In step 1208, a given sentiment classification of the given aspect term is generated utilizing a third machine learning model. The third machine learning model generates the given sentiment classification based at least in part on (i) the attention weights for the given subset of the words in the unstructured text data surrounding the given sequence of the one or more words and (ii) a given portion of the second set of encodings classifying the sentiment of the given subset of the words in the unstructured text data surrounding the given sequence of the one or more words. If the sequence of one or more words of the given aspect term comprises two or more words, the third machine learning model may generate the given sentiment classification based at least in part on an average of the given portion of the second set of encodings for each of the two or more words.

The third machine learning model may comprise a multi-level feed forward neural network classifier. The multi-level feed forward neural network classifier may comprise a three-level feed forward neural network classifier which classifies the given aspect term as having one of a positive sentiment, a neutral sentiment and a negative sentiment.

It should be noted that the first, second and third machine learning models used in steps 1202, 1204 and 1208 need not necessarily be three completely different machine learning models or machine learning model types. For example, two or more of the first, second and third machine learning models may be a same machine learning model, or different variants or other instances of the same machine learning model or machine learning model type. As described above, for example, in some embodiments both the first and second machine learning models comprise BERT-based machine learning models.

A response to the query is provided in step 1210, where the response to the query comprises the given sentiment classification of the given aspect term. In some embodiments, the document comprises at least one of a support chat log and a support call log associated with a given IT asset of an IT infrastructure and the FIG. 12 process further comprises identifying, utilizing the given sentiment classification, a recommended troubleshooting action for the given IT asset and performing the recommended troubleshooting action on the given IT asset. The recommended troubleshooting action may comprise at least one of a diagnostic action and a repair action. The given IT asset comprises a computing device, and the recommended troubleshooting action comprises modifying at least one of: one or more software components of the computing device; and one or more hardware components of the computing device.

In other embodiments, the document comprises at least one of an article, a survey and social media content associated with one or more IT asset types. The FIG. 12 process in such embodiments may further comprise adjusting investment by an entity in the one or more IT asset types based at least in part on the given sentiment classification, modifying configurations of IT assets in an IT infrastructure having the one or more types of IT asset types based at least in part on the given sentiment classification, combinations thereof, etc.

The entity-aspect term association determination logic 118 is configured to extract aspect terms and named entities from documents obtained from the document sources 106, and to determine associations between the extracted aspect terms and named entities. The entity-aspect term association determination logic 118 is configured to train a binary classification model to determine if a given sentence or other portion of a document has one or more entity-aspect term pair associations. In some embodiments, two models are used by the entity-aspect term association determination logic 118—a first model for aspect term extraction and a second model for determining entity-aspect term relationships. The first and second models are trained in parallel by averaging out encodings of the aspect terms from both models. The final encodings of the aspect terms are computed against all named entities (e.g., vendor companies) present in a given document using a similarity measure such as cosine similarity to determine the closest association between aspect terms and named entities.

Advantageously, the entity-aspect term association determination logic 118 provides a unique way of solving two tasks in parallel, the first task being aspect term extraction and the second task being predicting if a sentence or other portion of a document has one or more entity-aspect term pair associations or not. Both tasks are trained in parallel by averaging out encodings of aspect terms from models used for each task. To ensure that association between a named entity (e.g., in the case of technology articles or documents, named entities may be technology vendor companies) and an aspect term is accurately identified, and to ensure that a named entity strongly relates to the aspect term, the entity-aspect term association determination logic 118 may use a self-attention model to arrive at named entity attention influences on the aspect term. This is particularly useful in cases where there are multiple named entities in a given document or portion thereof being analyzed. This process may be referred to as entity-aspect term association mining. The entity-aspect term association determination logic 118 is also advantageously enabled to process one aspect term at a time to ensure the associated named entity or entities (if any) are accurately identified while also avoiding named entity association conflicts between multiple aspect terms.

Focused aspect term classification is provided by the entity-aspect term association determination logic 118 through the use of a two-level classification model for determining if a sentence has one or more associated named entities for an extracted aspect term. If the aspect term is a phrase (e.g., multiple words), each of the token/word embeddings are averaged out to feed a single embedding into the classification model while all other encoded words are ignored. The entity-aspect term association determination logic 118 also uses a similarity module to find the most closely associated named entity (or a top X most closely associated named entities) for each aspect term. The similarity module may use cosine similarity or another similarity measure that is computed between the encoded embeddings of all named entities (e.g., identified using a named entity recognizer (NER) such as a Spacy NER) individually against the aspect term in question. The named entity with the highest similarity (or the named entities with the X highest similarities) will qualify as the named entity associated with the aspect term being processed.

Advantageously, the models implemented using the entity-aspect term association determination logic 118 have the capability to identify the appropriate named entity for a given aspect term for any natural language text, making the solution domain-agnostic. The entity-aspect term association determination logic 118 can work across various types of documents containing unstructured text data, including but not limited to customer reviews, blogs, technology articles, social media data, etc. Thus, the solutions provided by the entity-aspect term association determination logic 118 are highly scalable, since the training was focused not on domain but on semantics for extracting aspect terms and determining their associated entities.

Conventional approaches for associating named entities with aspect terms utilize word embedding-based representations which capture the relationship between a named entity (e.g., a technology vendor) and aspect terms within the same vector space. A key shortcoming of such approaches is the prerequisite that the named entity (e.g., the technology vendor) and the aspect term lie within the same vector space. Thus, such approaches need an additional step of classifying named entities (e.g., technology vendors) into specific domains as a pre-processing step before finding vector space representations. This requires very specific domain related classification, and steps which may not be readily actionable for new domains and associated named entities.

The entity-aspect term association determination logic 118 in some embodiments is configured to intelligently tag or otherwise associate named entities (e.g., technology vendors) with each aspect term in a document, indicating belongingness and association. To do so, the entity-aspect term association determination logic 118 uses an entity-aspect term association miner implementing a self-attention module. The entity-aspect term association determination logic 118 is domain agnostic, and can work on articles, blogs, customer reviews and other types of documents across multiple domains (e.g., multiple different technology domains). In English grammar terms, the models implemented by the entity-aspect term association determination logic 118 have the intelligence to capture object-subject pairs, and can be used in a multitude of use cases where associations need to be established between attributing words and subjects. Such use cases include, but are not limited to, the use cases 1001, 1003, 1005 and 1007 described above with respect to FIG. 10. The functionality of the entity-aspect term association determination logic 118 may, in some cases, be combined with the functionality of the aspect term sentiment analysis logic 116 (e.g., to not only associate aspect terms with named entities, but to further determine the sentiment for the aspect terms and their associated named entities).

Various entities, such as technology vendors, need to constantly innovate to compete in the marketplace. The current global scenario dictates the need to understand technology trajectories with insight into key innovations across multiple dimensions whilst keeping costs low. The functionality of the aspect term sentiment analysis logic 116 and the entity-aspect term association determination logic 118 can effectively address these and other challenges with up-to-date information driven by state-of-the-art methods. The functionality of the aspect term sentiment analysis logic 116 and the entity-aspect term association determination logic 118, and other functionality of the trend analysis platform (e.g., logic 114, 120 and 122) can reduce an entity's reliance on third-party tools with faster customization and tracking capability on demand. This in essence leads to significant savings from license expenses associated with such third-party tools. The functionality of the trend analysis platform can also be extended to customers of a technology vendor, allowing customers in different domain areas to stay up-to-speed with business trajectories relevant to their business. Thus, the technology trend analysis platform 102 may be operated by one entity and offered to customers (e.g., end-users of the client devices 104) as a productized offering.

In illustrative embodiments, the entity-aspect term association determination logic 118 implements a novel approach referred to as contextual association mining, which is developed on top of BERT or another transformer-based model to accurately determine which named entities are associated with which themes or aspect terms in a document, where the document may include multiple mentions of named entities and multiple mentions of aspect terms, including multiple mentions of named entities and/or aspect terms within a particular sentence, paragraph or other portion of the document. Associating aspect terms with named entities is a useful task, and becomes even more compelling when coupled with downstream applications like aspect-based sentiment analysis provided via the aspect term sentiment analysis logic 116 of the technology trend analysis platform 102. The aspect term sentiment analysis logic 116 and the entity-aspect term association determination logic 118 of the technology trend analysis platform 102 (as well as other logic, such as the document summarization logic 114, the technology trend visualization generation logic 120 and the IT asset configuration logic 122) may be used by an entity or users thereof (e.g., internal sales makers, product engineers, product marketing teams, etc.) via client devices 104 and the client interface 110 to draw insights on which technology vendors are working on which themes or aspect terms of a particular technology domain (e.g., 5G, edge computing, etc.) by mining technology related news articles or other types of documents from the world wide web obtained via document sources 106. This can in turn help decision makers within an entity to have insights at their fingertips to take necessary timely actions and thereby stay ahead of competition.

The task of associating named entities with themes or aspect terms is applicable in any generic domain which utilizes unstructured text document sources. While some embodiments are described with respect to the technology trend analysis platform 102 being used by a technology company or other entity, embodiments are not limited solely to use of the technology trend analysis platform 102 by technology companies. The approaches described herein for identifying aspect terms or themes in unstructured text data, and individually associating such aspect terms or themes with individual name entity mentions in the unstructured text data provided by the entity-aspect term association determination logic 118 may be applied or used by various other types of entities in other domains.

The task of associating aspect terms with named entities is easier said than done, as each article or other type of document may have multiple aspect terms and multiple named entities. The entity-aspect term association determination logic 118 in some embodiments utilizes a deep learning based solution (e.g., using BERT pre-trained models) which extracts all aspect terms (e.g., such as using the functionality of the aspect term sentiment analysis logic 116) from an unstructured text document and individually associating each of the aspect terms to one or more individual named entities in the unstructured text document. To do so, the entity-aspect term association determination logic 118 uses an entity-aspect term association miner, which essentially finds cosine similarity between encoded aspect terms (e.g., encoded using BERT-based token classification) and encoded named entities (e.g., encoded using a self-attention module which is used to determine association strength between aspect terms and all available named entities). Both the encodings may be further refined and learned using a binary classifier (e.g., trained to find the presence of associations between aspect terms and named entities) before computing the cosine similarity.

Figure 13A:
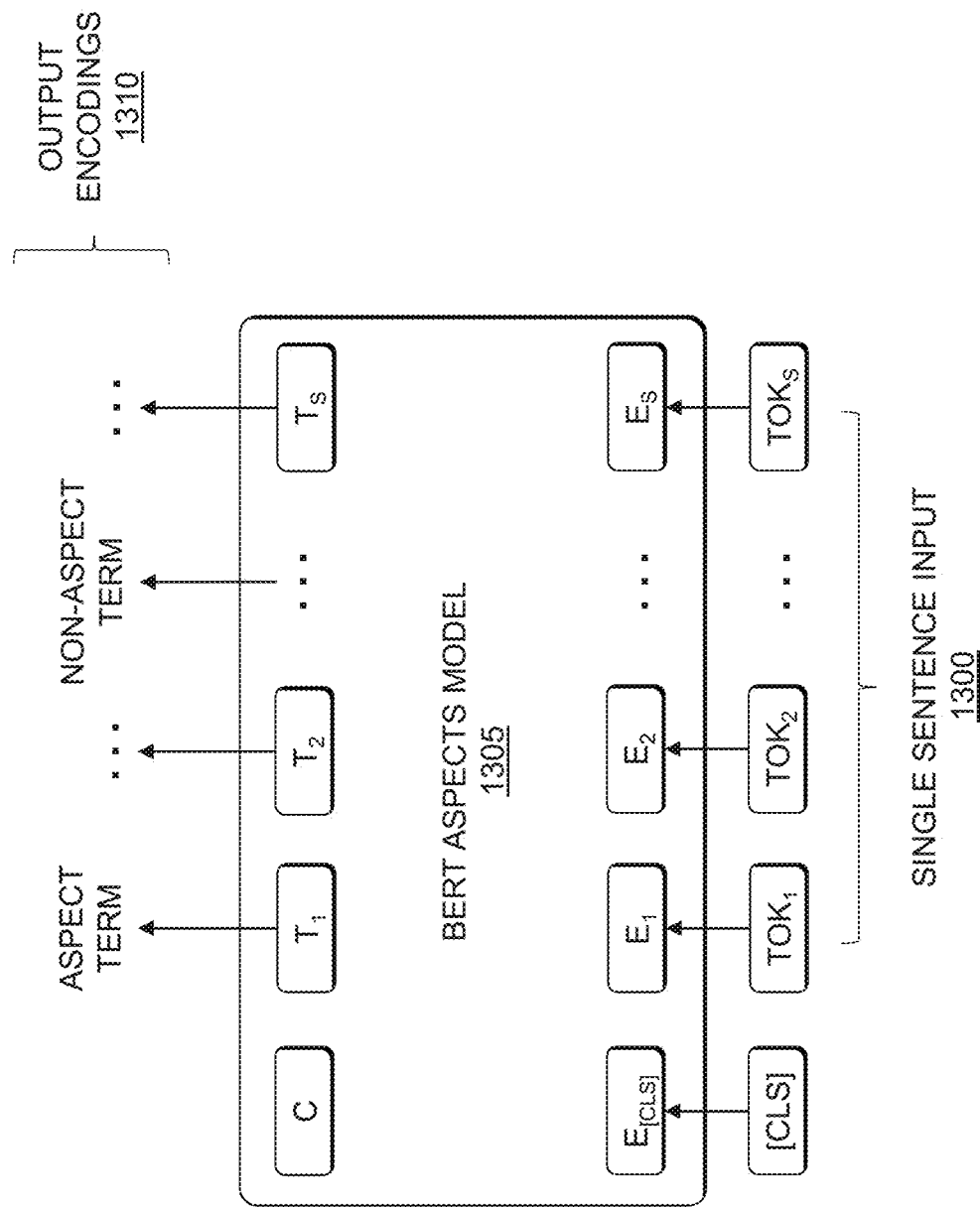
FIGS. 13A-13C show a deep learning architecture for entity-aspect term association mining in an illustrative embodiment.

The entity-aspect term association determination logic 118 may perform two tasks: (1) aspect term extraction; and (2) extracting and associating named entities to specific aspect terms. The first task, extracting aspect terms, includes identifying aspect terms (e.g., words or phrases that are being spoken about in each blog, article, or other text document). To do so, a training data set (e.g., containing around 2,500 articles spanning various technology domains) is created, and each word in a document is tagged as either an aspect term or a non-aspect term in a manner similar to that described above with respect to the aspect term sentiment analysis logic 116. A first model is used for token classification, to extract aspect terms. The first model is trained on the training data set to perform token classification, and thus the first model will have the intelligence to extract aspect terms for a given new document regardless of domain, as the intelligence built into the first model for token classification is about aspect term extraction but not domain learning thanks to including a wide variety of examples in the training data set. The first model, when tested, is able to separate out aspect terms from non-aspect terms (e.g., with a 94% F1 score and accuracy). FIG. 13A shows an example of the first model, implemented using a BERT architecture, which is referred to as a BERT Aspects model 1305. The BERT Aspects model 1305 is similar to the BERT Aspects model 805, in that it receives a single sentence input 1300 and generated outputs $T_1, T_2, \ldots T_S$ corresponding to words of the sentence to produce output encodings 1310 indicating whether each of the words of the sentence is an aspect term or not.

Figure 13B:
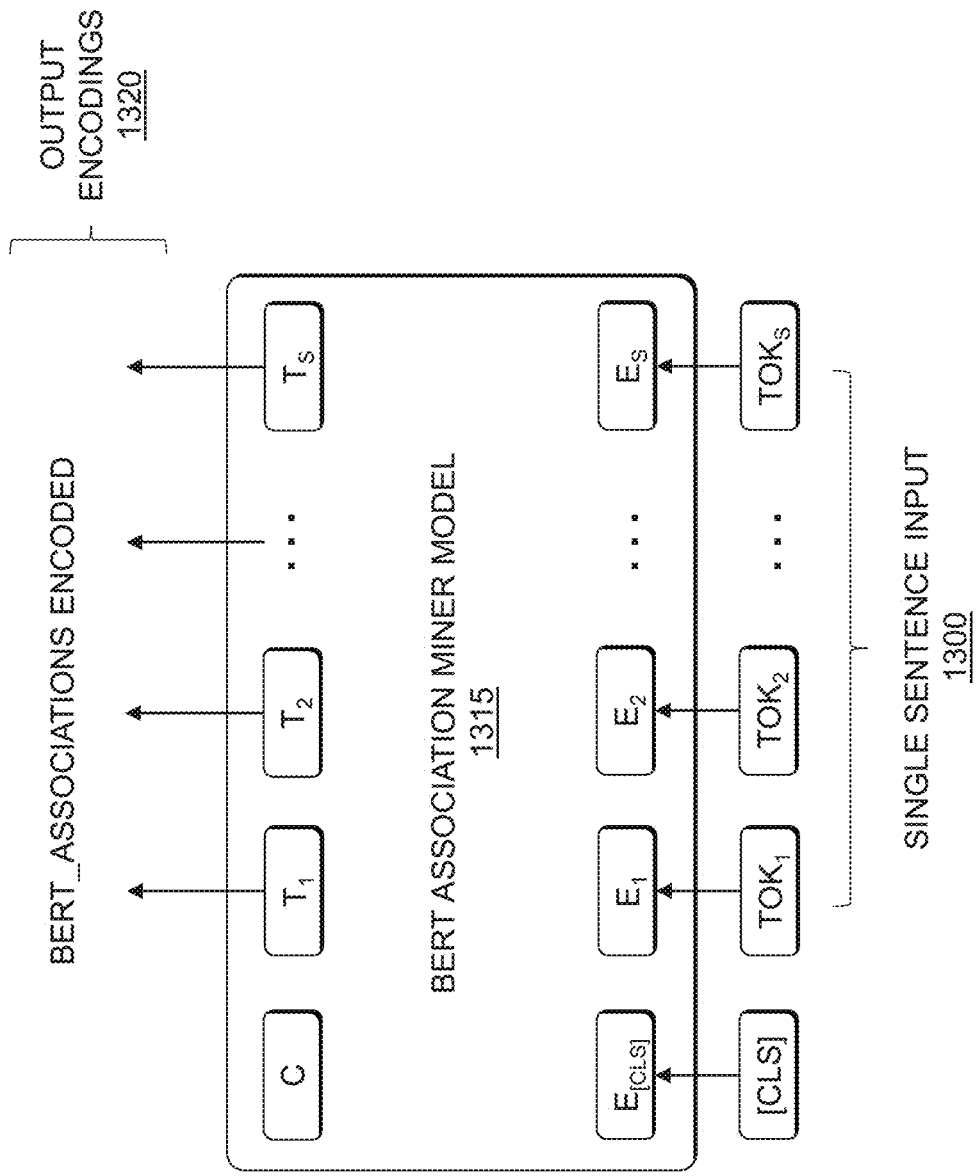

The second task is to extract named entities, and may be performed as a parallel downstream transfer learning task using BERT and a novel concept referred to herein as an entity-aspect term association miner. The entity-aspect term association miner uses a second model for fine-tuning association classification of aspect terms, to tag or associate aspect terms extracted using the first model with specific named entities. The second model, similar to the first model, may be BERT-based. Named entity recognition may used a named entity recognizer (NER) such as a Spacy NER. FIG. 13B shows an example of the second model, implemented using a BERT architecture, which is referred to as a BERT Association Miner model 1315. The BERT Association Miner model 1315 shown in FIG. 13B receives the same input 1300 as the BERT Aspects model 1305 shown in FIG. 13A. The BERT Association Miner model 1315 encodes the input 1300 using BERT_Association_Miner transformers to produce output encodings 1320.

Figure 13C:
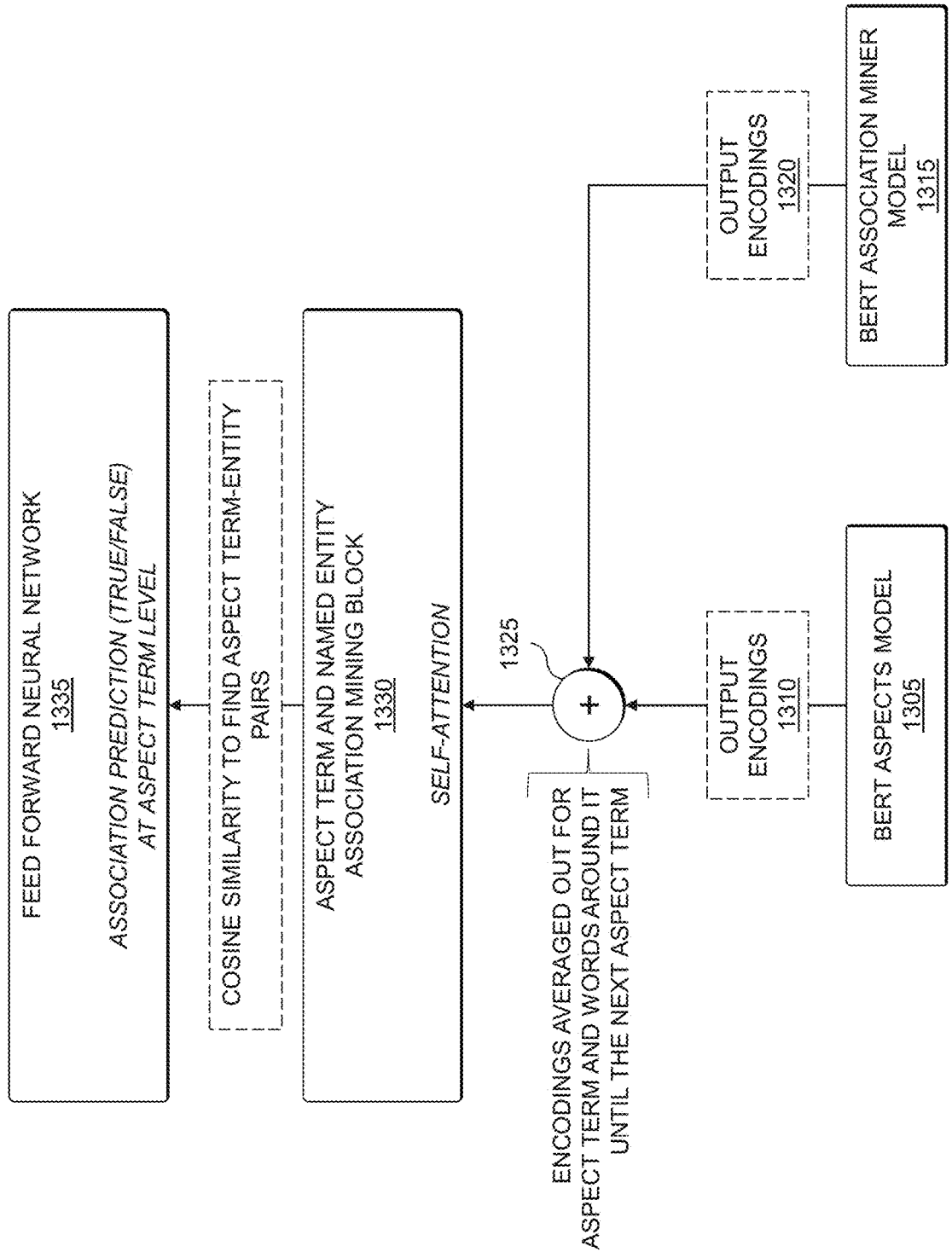

FIG. 13C shows an overall architecture, illustrating how the output encodings 1310 and 1320 from the BERT Aspects model 1305 and the BERT Association Miner model 1315 are combined. The output encodings 1310 and 1320 are combined in adder 1325, which averages such encodings out. The output encodings 1310 are averaged out with encoded vectors in the output encodings 1320 (e.g., in multiple dimensions, such as in 768 dimensions). The combined output from adder 1325 is provided to an aspect term and named entity association mining block 1330, which implements a self-attention module. The output of the aspect term and named entity association mining block 1310 is provided to a feed forward neural network 1335 which predicts associations between aspect terms and named entities at an aspect term level. The feed forward neural network 1335, for example, may predict whether each entity-aspect term pair association is true or false (e.g., whether there is a presence of an entity-aspect term pair or not in the current document being analyzed). The BERT Association Miner model 1315 is trained for each aspect term one at a time, which means that in a given document that has four aspect terms, the BERT Association Miner model 1315 will be able to train one aspect at a time such that even while inferencing the BERT Association Miner model 1315 will predict one or more named entities that are associated with each aspect term one at a time.

The aspect term and named entity association mining block 1330 may determine the most appropriate named entity to pair with each aspect term by computing the cosine similarity between all encoded vectors of all aspect terms and the encoded vectors of all named entities. The pairs with the maximum cosine similarity are declared as the associated entity-aspect term pairs. The BERT Association Miner model 1315, when tested, is able to predict with about 82% F1 score and 86% accuracy, aspect terms from non-aspect terms.

Figure 14:
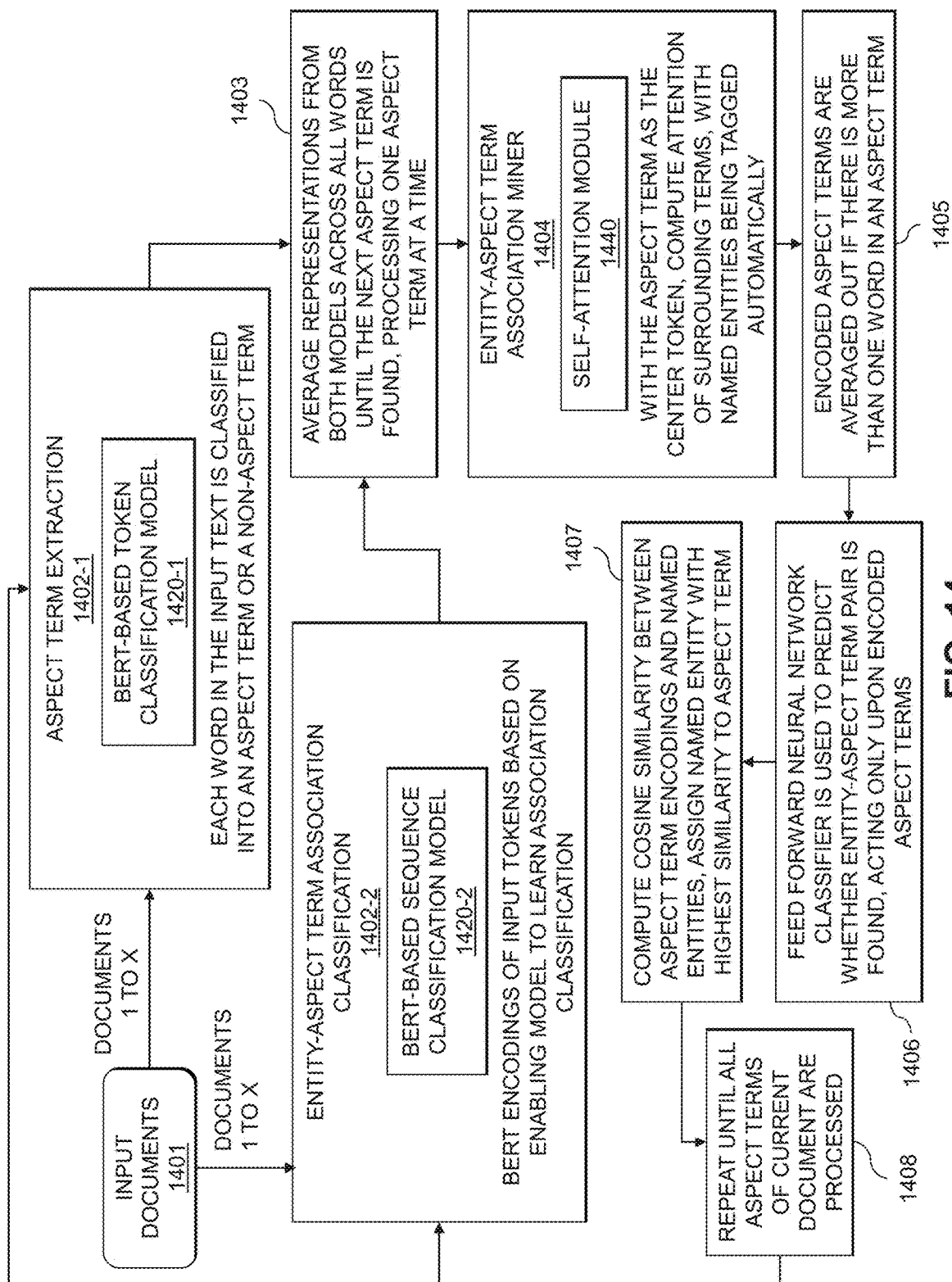
FIG. 14 shows a process flow for entity-aspect term association mining in an illustrative embodiment.

FIG. 14 shows an overall process flow for determining entity-aspect term associations. In step 1401, a set of input documents 1 to X is used, where each of the input documents is inferred one at a time. In step 1402-1, each word in a given one of the input documents is classified as either an aspect term or a non-aspect term using a BERT-based token classification model 1420-1 (e.g., the BERT Aspects model 1305 described above). Step 1402-1 is similar to step 902-1 in the FIG. 9 process flow. Step 1402-2, which may be performed in parallel with step 1402-1, uses a BERT-based sequence classification model 1420-2 (e.g., the BERT Association Miner model 1315 described above) to encode the same words.

The overall processing of the FIG. 14 process flow proceeds sequentially from steps 1402-1 and 1402-2 (collectively, step 1402), one aspect term at a time. In step 1403, the encodings output by the BERT-based token classification model 1420-1 and the BERT-based sequence classification model 1420-2 in steps 1402-1 and 1402-2, respectively, are averaged out. Step 1403 may be performed in a manner similar to that described above with respect to step 903 in the FIG. 9 process flow, though different encodings are being averaged out. The averaged-out encodings produced in step 1403 are sent to an entity-aspect term association miner block 1404 implementing a self-attention module 1440. A NER model, such as the SPACY NER model, may be used to determine the named entities in the document. In the entity-aspect term association miner block 1404, the self-attention module 1440 is used to tag named entities which are associated with an aspect term. With the aspect term as the center token, the self-attention module 1440 computes the attention of surrounding terms automatically tagging the named entities.

As noted above, it is possible for an aspect term to be a phrase (e.g., multiple words). In such a case, separate encodings will be produced for each word of the aspect term. In step 1405, the different word encodings of the aspect term are averaged out if there is more than one word in the aspect term. If the aspect term is a single word, step 1405 may be skipped. The final aspect term encodings (e.g., from step 1405 if there is more than one word in the aspect term, from step 1404 if the aspect term is a single word) are provided to a feed forward neural network classifier in step 1406. The feed forward neural network classifier predicts whether any entity-aspect term pairs are found, acting only upon encoded aspect terms. In step 1407, a similarity measure such as cosine similarity is computed between the aspect term encodings and the named entities. In some embodiments, the named entity with the highest similarity to an aspect term is assigned to that aspect term to produce an entity-aspect term association pair. It should be noted that in other embodiments, a top X named entities with the top X highest similarities to an aspect term may be assigned to that aspect term to produce X entity-aspect term association pairs, where X is greater than 1. The particular value of X may be set by an end-user as desired for a particular implementation. Rather than a specific number, X may represent a cutoff similarity value such that entity-aspect term association pairs are generated for all named entities that have at least the cutoff similarity value to an aspect term. Such entity-aspect term association pairs may be presented to an end-user for confirmation if desired. In step 1408, steps 1402 through 1407 are repeated for the next aspect term in the given document. Once all of the aspect terms in the given document have been processed, the next document is taken up until sentiment prediction has been performed for all aspect terms of all of the input documents 1401.

The above-described approaches for aspect term extraction and entity-aspect term pair association mining implemented using the entity-aspect term association determination logic 118 may be used in various different application areas including but not limited to the application areas 1001, 1003, 1005 and 1007 described above with respect to FIG. 10. Consider, as an example, a technology entity that wishes to analyze news articles or other documents on "as-a-service IT business" across various vendors (e.g., Vendor A, Vendor B, Vendor C, etc.) on specific themes like customer service, dependability, pricing, etc. There is a need to determine which mentions of these themes or aspect terms in a document are associated with the different vendors, which are examples of named entities. Aspect term-based sentiment analysis using the aspect term sentiment analysis logic 116 may be further performed to summarize sentiments across themes or aspect terms and their associated vendors. This helps to summarize (e.g., globally) which technology vendors are faring better, and which vendors have a scope for improvement on various themes (e.g., aspect terms) like customer service, pricing, dependability, etc.

Conventional approaches for named entity recognition may require the use of word embedding-based representations which capture the relationships between named entities and aspect terms within the same vector space. Such conventional approaches, however, suffer from various disadvantages including the fact that contextual association between named entities and aspect terms is completely ignored. Further, such conventional approaches are very much dependent on the corpus on which the word embeddings are learned. Therefore, such conventional approaches are typically very domain dependent. Conventional approaches also lack an attention mechanism, and therefore are unable to understand contextual relationships between various words in different sentences.

The technology trend analysis platform 102 may be used to draw summarized insights from technology articles or other documents across a slice and dice of various industry verticals, technology vendors and the themes/aspect terms they are associated with. Using the entity-aspect term association determination logic 118 provides the capability to associate technology vendors or other named entities with aspect terms. This can help answer questions such as which technology companies are progressing and innovating on which technology topics, where does a particular technology company stand among its competitors, what actions and strategies should be devised to beat the competition, where should a particular technology company invest to stay ahead in the technology race, etc. Further, the techniques described herein can facilitate or enable other downstream tasks like determining sentiments across various themes (e.g., using the aspect term sentiment analysis logic 116). Applications like these can help product engineers, marketing and sales drivers, and other parts of a company or other entity to create strategies and design plans to help be the front runner in initiating newer business models.

In order to ensure accurate identification of associations between named entities and aspect terms, and to determine how strongly particular named entities relate to extracted aspect terms, the entity-aspect term association determination logic 118 in some embodiments implements a self-attention model to determine vendor or other named entity attention influences on aspect terms. This is needed more so in cases where there is more than one named entity in a particular document. Thus, some embodiments utilize the named entity-aspect term association miner as described elsewhere herein. Further, a contextual aspect term-named entity pair binary classifier is utilized, providing a two level classification model for determining if a sentence or other portion of a document has an associated named entity for an extracted aspect term. This is used to encode both the named entities and the extracted aspect terms put together in a context to determine the association strength. Similarity measures are used to find the closest associations between named entities and each aspect term. In some embodiments, the similarity measures comprise cosine similarities computed between the encoded embeddings of all named entities (e.g., identified using a SPACY or other type of NER) individually against the aspect term in question, and the one or ones that have the highest similarity (or similarity above some threshold) will qualify as a named entity associated with the aspect term.

Consider, as an example, a portion of an article on three-dimensional (3D) printing. FIG. 15 shows an example 1500 of a portion of the text of such a document. During inference, as noted above, two tasks are performed: aspect term extraction and extracting and associating named entities (e.g., technology vendors) with specific ones of the extracted aspect terms. The text shown in the example 1500 of FIG. 15 may be trained as a token-classification problem using a first model (e.g., BERT Aspects model 1305) that classifies each word or token into either an aspect term or a non-aspect term. In the FIG. 15 example, the BERT Aspects model 1305 extracts the following as aspect terms: metal AM technology; complex shapes; quality standards; investment; AM technology; digitalization; and manufacturing processes. Most of these aspect terms have more than one word, and each word of the aspect term will have one encoding from the first model (e.g., BERT Aspects model 1305) and a second model (e.g., BERT Association Miner model 1315) that is used to determine the presence of entity-aspect term associations. The encodings from the first and second models may be in a multi-dimension space, such as a 768 dimension space, and will be averaged out (e.g., in adder 1325) for further processing in entity-aspect term association mining (e.g., in entity-aspect term association mining block 1330).

A self-attention module (e.g., set up as part of the entity-aspect term association mining block 1330) acts upon an average of the encodings from the first and second models (e.g., the BERT Aspects model 1305 and the BERT Association Miner model 1315) for each aspect term. Continuing with the example of FIG. 15, the first aspect term is "metal AM technology" and the self-attention module considers all the words around it in the entire article which is "VENDOR1 now recognizes that advances in metal AM technology have made it possible to form extremely complex shapes while meeting appropriate quality standards. Major manufacturing companies are accelerating their investment in AM technology as one of the core areas of the digitalization of manufacturing processes, one such example is VENDOR2." All the words, other than the aspect term "metal AM technology" will be applied upon the aspect term using a self-attention mechanism. With the help of a NER such as the Spacy NER, "VENDOR1" and "VENDOR2" will already be tagged as technology vendor companies (e.g., named entities). This is further followed by a feed forward binary classifier neural network, which learns the ability to classify if a given sub sentence in an article has one or more entity-aspect term association pairs. A training data set may be hand-built which has a large number (e.g., 2500) of such sub-sentences and which has both kinds of records: those with the presence of entity-aspect term pairs (e.g., where the named entity is a technology vendor); and those without the presence of any entity-aspect term pairs.

During the process of training/inferencing through the binary classifier, final encodings of each aspect term and each named entity are determined. The associations between each aspect term and each named entity can be realized by calculating a cosine similarity (or other similarity measure) on their final encoded vectors. In the FIG. 15 example, the named entity "VENDOR1a" will have 2 vectors (e.g., of 768 size each) and the aspect term "metal AM Technology" will have 3 vectors (e.g., of 768 size each) from the combined encodings from the first and second models, with the named entity-aspect term association miner included. Likewise, the named entity "VENDOR2" will have 2 vectors (e.g., of 768 size each). The mentioned two, three and two vectors are averaged out respectively among themselves. The resultant vectors are used to determine the cosine similarity between each aspect term and each named entity. The magnitude of the cosine similarity will give the strength of association, and it is observed in this example that the cosine similarity of the aspect term "metal AM Technology" encoding with the named entity "VENDOR1" is higher than that of the named entity "VENDOR2," and thus the aspect term "metal AM Technology" will be associated with the named entity "VENDOR1." The above steps are repeated for all aspect terms individually while training/inferencing in a given document. Eventually, in the FIG. 15 example, the named entity "VENDOR1" will be associated with the aspect terms "metal AM Technology," "complex shapes" and "quality standards" while the named entity "VENDOR2" will be associated with the aspect terms "digitization," "AM Technology," "investment" and "manufacturing process."

An exemplary process for determining named entities associated with aspect terms extracted from documents having unstructured text data will now be described in more detail with reference to the flow diagram of FIG. 16. It is to be understood that this particular process is only an example, and that additional or alternative processes for determining named entities associated with aspect terms extracted from documents having unstructured text data can be carried out in other embodiments.

In this embodiment, the process includes steps 1600 through 1610. These steps are assumed to be performed by the technology trend analysis platform 102 utilizing the entity-aspect term association determination logic 118, the technology trend visualization generation logic 120 and the IT asset configuration logic 122. The process begins with step 1600, receiving a query to determine associations between named entities and aspect terms for a document, the document comprising unstructured text data.

In step 1602, a first set of encodings of the unstructured text data of the document is generated utilizing a first machine learning model. The first set of encodings classifies each word of the unstructured text data of the document as being an aspect term or a non-aspect term. In step 1604, a second set of encodings of the unstructured text data of the document is generated utilizing a second machine learning model. The second set of encodings classifies associations of each word of the unstructured text data of the document. The first machine learning model may be pretrained using a plurality of documents associated with a plurality of different technology domains, and the second machine learning model may be trained individually for each of the one or more words classified as an aspect term in the first set of encodings.

Figure 16:
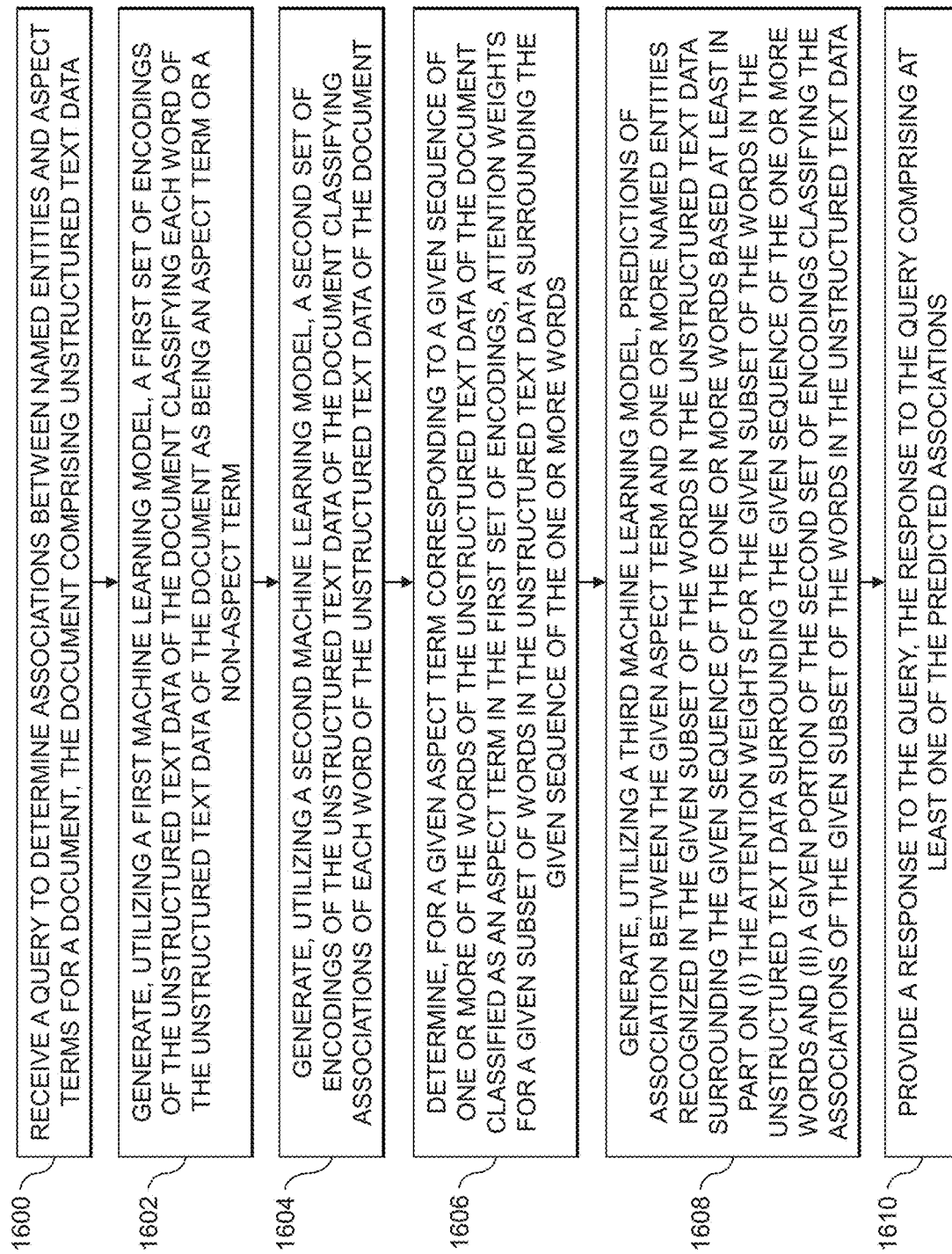
FIG. 16 is a flow diagram of an exemplary process for determining named entities associated with aspect terms extracted from documents having unstructured text data in an illustrative embodiment.

The FIG. 16 process continues in step 1606 with determining, for a given aspect term corresponding to a given sequence of one or more of the words of the unstructured text data of the document classified as an aspect term in the first set of encodings, attention weights for a given subset of words in the unstructured text data surrounding the given sequence of the one or more words. The given subset of the words in the unstructured text data surrounding the given sequence of the one or more words corresponding to the given aspect term may comprise (i) a first subset of words prior to the given sequence of the one or more words until a previous aspect term or a beginning of the document is reached and (ii) a second subset of words following the given sequence of the one or more words until a next aspect term or an end of the document is reached.

In step 1608, predictions of association between the given aspect term and one or more named entities recognized in the given subset of the words in the unstructured text data surrounding the given sequence of the one or more words corresponding to the given aspect term are generated utilizing a third machine learning model. The third machine learning model generates the predictions based at least in part on (i) the attention weights for the given subset of the words in the unstructured text data surrounding the given sequence of the one or more words and (ii) a given portion of the second set of encodings classifying the associations of the given subset of the words in the unstructured text data surrounding the given sequence of the one or more words corresponding to the given aspect term. If the sequence of the one or more words corresponding to the given aspect term comprises two or more words, the third machine learning model may generate the predictions based at least in part on computing an average of the given portion of the second set of encodings for each of the two or more words. The third machine learning model may comprise a multi-level feed forward neural network classifier. The multi-level feed forward neural network classifier may comprise a two-level feed forward neural network classifier which classifies the given aspect term as having or not having an association with each of the one or more named entities.

It should be noted that the first, second and third machine learning models used in steps 1602, 1604 and 1608 need not necessarily be three completely different machine learning models or machine learning model types. For example, two or more of the first, second and third machine learning models may be a same machine learning model, or different variants or other instances of the same machine learning model or machine learning model type. As described above, for example, in some embodiments both the first and second machine learning models comprise BERT-based machine learning models.

A response to the query is provided in step 1610, where the response to the query comprises at least one of the predicted associations between the given aspect term and the one or more named entities. The FIG. 16 process may include selecting said at least one of the predicted associations between the given aspect term and the one or more named entities based at least in part on cosine similarity measures computed between the first set of encodings and the second set of encodings.

In some embodiments, the document comprises at least one of a support chat log and a support call log associated with a given IT asset of an IT infrastructure, and the FIG. 16 process further comprises identifying, utilizing said at least one of the predicted associations between the given aspect term and the one or more named entities, a recommended troubleshooting action for the given IT asset and performing the recommended troubleshooting action on the given IT asset. The recommended troubleshooting action may comprise at least one of a diagnostic action and a repair action. The given IT asset comprises a computing device, and the recommended troubleshooting action comprises modifying at least one of: one or more software components of the computing device; and one or more hardware components of the computing device.

In other embodiments, the document comprises at least one of an article, a survey and social media content associated with one or more IT asset types. The FIG. 16 process in such embodiments may further comprise adjusting investment by an entity in the one or more IT asset types based at least in part on said at least one of the predicted associations between the given aspect term and the one or more named entities the given sentiment classification, modifying configurations of IT assets in an IT infrastructure having the one or more types of IT asset types based at least in part on said at least one of the predicted associations between the given aspect term and the one or more named entities, combinations thereof, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for document summarization, aspect term extraction and sentiment analysis, and entity-aspect term association determination will now be described in greater detail with reference to FIGS. 17 and 18.

Figure 17:
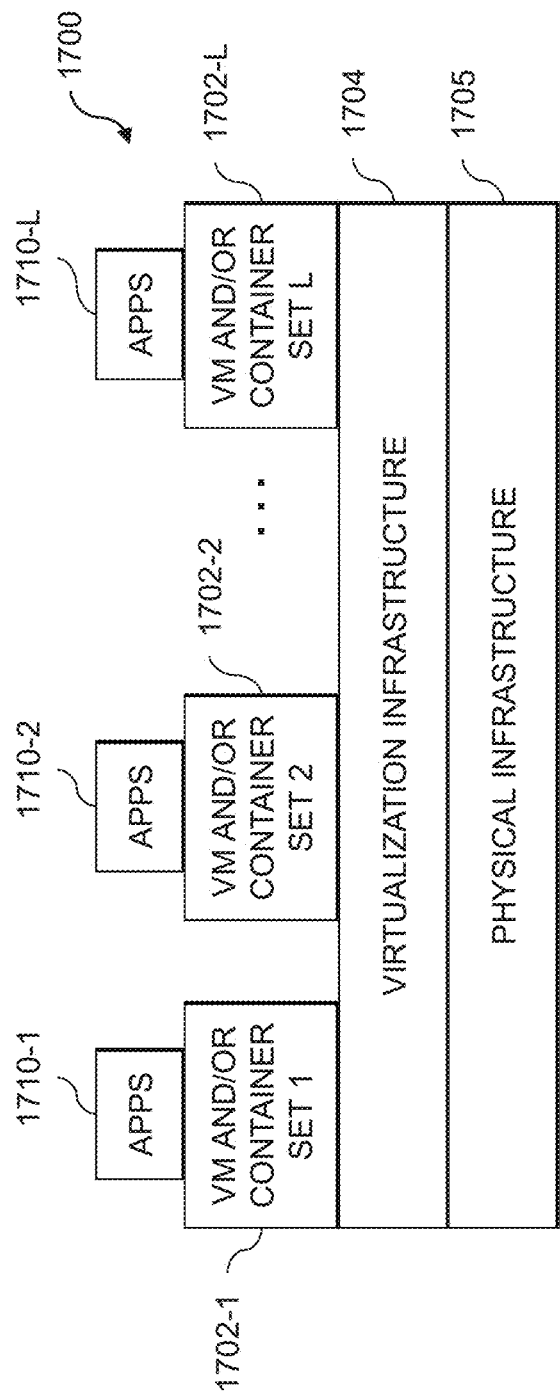
FIGS. 17 and 18 show examples of processing platforms that may be utilized to implement at least a portion of an information processing system in illustrative embodiments.
Figure 18:
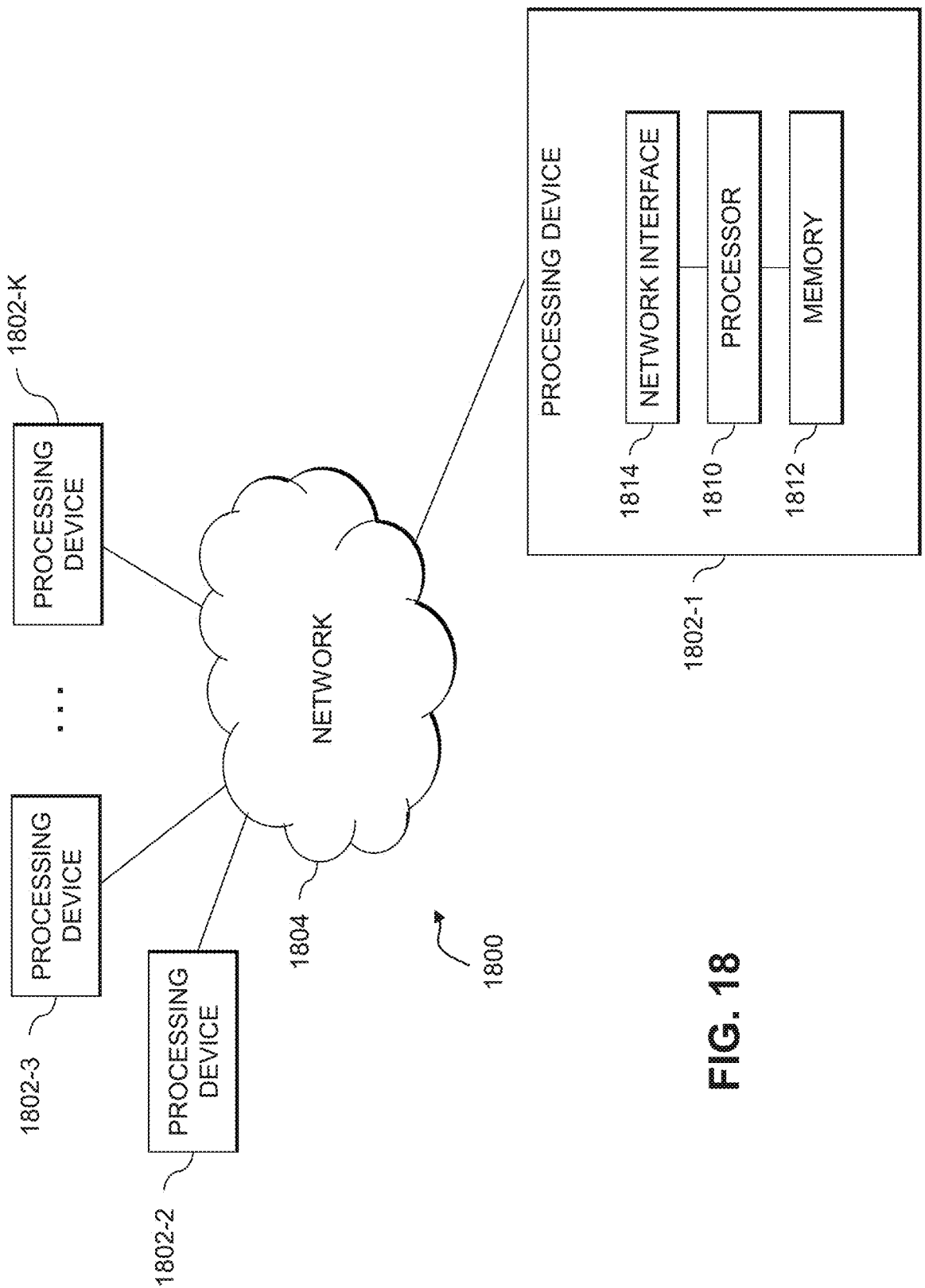

FIG. 17 shows an example processing platform comprising cloud infrastructure 1700. The cloud infrastructure 1700 comprises a combination of physical and virtual processing resources that may be utilized to implement at least a portion of the information processing system 100. The cloud infrastructure 1700 comprises multiple virtual machines (VMs) and/or container sets 1702-1, 1702-2, . . . 1702-L implemented using virtualization infrastructure 1704. The virtualization infrastructure 1704 runs on physical infrastructure 1705, and illustratively comprises one or more hypervisors and/or operating system level virtualization infrastructure. The operating system level virtualization infrastructure illustratively comprises kernel control groups of a Linux operating system or other type of operating system.

The cloud infrastructure 1700 further comprises sets of applications 1710-1, 1710-2, . . . 1710-L running on respective ones of the VMs/container sets 1702-1, 1702-2, . . . 1702-L under the control of the virtualization infrastructure 1704. The VMs/container sets 1702 may comprise respective VMs, respective sets of one or more containers, or respective sets of one or more containers running in VMs.

In some implementations of the FIG. 17 embodiment, the VMs/container sets 1702 comprise respective VMs implemented using virtualization infrastructure 1704 that comprises at least one hypervisor. A hypervisor platform may be used to implement a hypervisor within the virtualization infrastructure 1704, where the hypervisor platform has an associated virtual infrastructure management system. The underlying physical machines may comprise one or more distributed processing platforms that include one or more storage systems.

In other implementations of the FIG. 17 embodiment, the VMs/container sets 1702 comprise respective containers implemented using virtualization infrastructure 1704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of an information processing system (e.g., system 100) may each run on a computer, server, storage device or other processing platform element. A given such element may be viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of an information processing system and includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1812 may comprise random access memory (RAM), read-only memory (ROM), flash memory or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and an information processing system may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for document summarization, aspect term extraction and sentiment prediction, and determination of entity-aspect term associations as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
     receiving a query to determine associations between named entities and aspect terms for a document, the document comprising unstructured text data;
     generating, utilizing a first machine learning model, a first set of encodings of the unstructured text data of the document, the first set of encodings classifying each word of the unstructured text data of the document as being an aspect term or a non-aspect term;
     generating, utilizing a second machine learning model, a second set of encodings of the unstructured text data of the document, the second set of encodings classifying associations of each word of the unstructured text data of the document;
     determining, for a given aspect term corresponding to a given sequence of one or more of the words of the unstructured text data of the document classified as an aspect term in the first set of encodings, attention weights for a given subset of words in the unstructured text data surrounding the given sequence of the one or more words;
     generating, utilizing a third machine learning model, predictions of association between the given aspect term and one or more named entities recognized in the given subset of the words in the unstructured text data surrounding the given sequence of the one or more words, the third machine learning model generating the predictions based at least in part on (i) the attention weights for the given subset of the words in the unstructured text data surrounding the given sequence of the one or more words and (ii) a given portion of the second set of encodings classifying the associations of the given subset of the words in the unstructured text data surrounding the given sequence of the one or more words; and
     providing a response to the query, the response to the query comprising at least one of the predicted associations between the given aspect term and the one or more named entities;
   wherein the third machine learning model comprises a multi-level feed forward neural network classifier.

2. The apparatus of claim 1 wherein the given subset of the words in the unstructured text data surrounding the given sequence of the one or more words corresponding to the given aspect term comprises (i) a first subset of words prior to the given sequence of the one or more words corresponding to the given aspect term until a previous aspect term or a beginning of the document is reached and (ii) a second subset of words following the given sequence of the one or more words corresponding to the given aspect term until a next aspect term or an end of the document is reached.

3. The apparatus of claim 1 wherein the at least one processing device is further configured to perform the step of selecting said at least one of the predicted associations between the given aspect term and the one or more named entities based at least in part on cosine similarity measures computed between the first set of encodings and the second set of encodings.

4. The apparatus of claim 1 wherein, if the sequence of the one or more words corresponding to the given aspect term comprises two or more words, the third machine learning model generates the predictions based at least in part on computing an average of the given portion of the second set of encodings for each of the two or more words.

5. The apparatus of claim 1 wherein the multi-level feed forward neural network classifier comprises a two-level feed forward neural network classifier which classifies the given aspect term as having or not having an association with each of the one or more named entities.

6. The apparatus of claim 1 the document comprises at least one of a support chat log and a support call log associated with a given information technology asset of an information technology infrastructure, and wherein the at least one processing device is further configured to perform the steps of:

identifying, utilizing said at least one of the predicted associations between the given aspect term and the one or more named entities, a recommended troubleshooting action for the given information technology asset; and performing the recommended troubleshooting action on the given information technology asset.

7. The apparatus of claim 6 wherein the recommended troubleshooting action comprises at least one of a diagnostic action and a repair action.

8. The apparatus of claim 6 wherein the given information technology asset comprises a computing device, and wherein the recommended troubleshooting action comprises modifying at least one of: one or more software components of the computing device; and one or more hardware components of the computing device.

9. The apparatus of claim 1 wherein the document comprises at least one of an article, a survey and social media content associated with one or more information technology asset types.

10. The apparatus of claim 9 wherein the at least one processing device is further configured to perform the step of adjusting investment by an entity in the one or more information technology asset types based at least in part on said at least one of the predicted associations between the given aspect term and the one or more named entities.

11. The apparatus of claim 9 wherein the at least one processing device is further configured to perform the step of modifying configurations of information technology assets in an information technology infrastructure having the one or more types of information technology asset types based at least in part on said at least one of the predicted associations between the given aspect term and the one or more named entities.

12. An apparatus comprising:

at least one processing device comprising a processor coupled to a memory;

the at least one processing device being configured to perform steps of:

receiving a query to determine associations between named entities and aspect terms for a document, the document comprising unstructured text data;

generating, utilizing a first machine learning model, a first set of encodings of the unstructured text data of the document, the first set of encodings classifying each word of the unstructured text data of the document as being an aspect term or a non-aspect term;

generating, utilizing a second machine learning model, a second set of encodings of the unstructured text data of the document, the second set of encodings classifying associations of each word of the unstructured text data of the document;

determining, for a given aspect term corresponding to a given sequence of one or more of the words of the unstructured text data of the document classified as an aspect term in the first set of encodings, attention weights for a given subset of words in the unstructured text data surrounding the given sequence of the one or more words;

generating, utilizing a third machine learning model, predictions of association between the given aspect term and one or more named entities recognized in the given subset of the words in the unstructured text data surrounding the given sequence of the one or more words, the third machine learning model generating the predictions based at least in part on (i) the attention weights for the given subset of the words in the unstructured text data surrounding the given sequence of the one or more words and (ii) a given portion of the second set of encodings classifying the associations of the given subset of the words in the unstructured text data surrounding the given sequence of the one or more words; and providing a response to the query, the response to the query comprising at least one of the predicted associations between the given aspect term and the one or more named entities;

wherein the first machine learning model comprises a bidirectional encoder representations from transformers token classification model, and wherein the second machine learning model comprises a bidirectional encoder representations from transformers sequence classification model.

13. The apparatus of claim 12 wherein the first machine learning model is pretrained using a plurality of documents associated with a plurality of different technology domains, and wherein the second machine learning model is trained for each aspect term.

14. The apparatus of claim 12 wherein the third machine learning model comprises a multi-level feed forward neural network classifier.

15. A computer program product comprising a non-transitory processor-readable storage medium having stored therein program code of one or more software programs, wherein the program code when executed by at least one processing device causes the at least one processing device to perform steps of:

receiving a query to determine associations between named entities and aspect terms for a document, the document comprising unstructured text data;

generating, utilizing a first machine learning model, a first set of encodings of the unstructured text data of the document, the first set of encodings classifying each word of the unstructured text data of the document as being an aspect term or a non-aspect term;

generating, utilizing a second machine learning model, a second set of encodings of the unstructured text data of the document, the second set of encodings classifying associations of each word of the unstructured text data of the document;

determining, for a given aspect term corresponding to a given sequence of one or more of the words of the unstructured text data of the document classified as an aspect term in the first set of encodings, attention weights for a given subset of words in the unstructured text data surrounding the given sequence of the one or more words;

generating, utilizing a third machine learning model, predictions of association between the given aspect term and one or more named entities recognized in the given subset of the words in the unstructured text data surrounding the given sequence of the one or more words, the third machine learning model generating the predictions based at least in part on (i) the attention weights for the given subset of the words in the unstructured text data surrounding the given sequence of the one or more words and (ii) a given portion of the second set of encodings classifying the associations of the given subset of the words in the unstructured text data surrounding the given sequence of the one or more words; and providing a response to the query, the response to the query comprising at least one of the predicted associations between the given aspect term and the one or more named entities;

wherein the third machine learning model comprises a multi-level feed forward neural network classifier.

16. The computer program product of claim 15 wherein the given subset of the words in the unstructured text data surrounding the given sequence of the one or more words corresponding to the given aspect term comprises (i) a first subset of words prior to the given sequence of the one or more words until a previous aspect term or a beginning of the document is reached and (ii) a second subset of words following the given sequence of the one or more words until a next aspect term or an end of the document is reached.

17. The computer program product of claim 16 wherein the program code when executed by the at least one processing device further causes the at least one processing device to perform the step of selecting said at least one of the predicted associations between the given aspect term and the one or more named entities based at least in part on cosine similarity measures computed between the first set of encodings and the second set of encodings.

18. A method comprising:
receiving a query to determine associations between named entities and aspect terms for a document, the document comprising unstructured text data;

generating, utilizing a first machine learning model, a first set of encodings of the unstructured text data of the document, the first set of encodings classifying each word of the unstructured text data of the document as being an aspect term or a non-aspect term;

generating, utilizing a second machine learning model, a second set of encodings of the unstructured text data of the document, the second set of encodings classifying associations of each word of the unstructured text data of the document;

determining, for a given aspect term corresponding to a given sequence of one or more of the words of the unstructured text data of the document classified as an aspect term in the first set of encodings, attention weights for a given subset of words in the unstructured text data surrounding the given sequence of the one or more words;

generating, utilizing a third machine learning model, predictions of association between the given aspect term and one or more named entities recognized in the given subset of the words in the unstructured text data surrounding the given sequence of the one or more words, the third machine learning model generating the predictions based at least in part on (i) the attention weights for the given subset of the words in the unstructured text data surrounding the given sequence of the one or more words and (ii) a given portion of the second set of encodings classifying the associations of the given subset of the words in the unstructured text data surrounding the given sequence of the one or more words; and providing a response to the query, the response to the query comprising at least one of the predicted associations between the given aspect term and the one or more named entities;

wherein the third machine learning model comprises a multi-level feed forward neural network classifier; and wherein the method is performed by at least one processing device comprising a processor coupled to a memory.

19. The method of claim 18 wherein the given subset of the words in the unstructured text data surrounding the given sequence of the one or more words corresponding to the given aspect term comprises (i) a first subset of words prior to the given sequence of the one or more words until a previous aspect term or a beginning of the document is reached and (ii) a second subset of words following the given sequence of the one or more words until a next aspect term or an end of the document is reached.

20. The method of claim 19 further comprising selecting said at least one of the predicted associations between the given aspect term and the one or more named entities based at least in part on cosine similarity measures computed between the first set of encodings and the second set of encodings.

* * * * *